US011949348B2

(12) United States Patent
Drofenik et al.

(10) Patent No.: US 11,949,348 B2
(45) Date of Patent: Apr. 2, 2024

(54) BI-DIRECTIONAL LINE-INTERPHASE TRANSFORMER-BASED CONVERTER

(71) Applicant: ABB E-mobility B.V., Delft (NL)

(72) Inventors: Uwe Drofenik, Zürich (CH); Francisco Canales, Baden-Dättwil (CH); Daniel Rothmund, Mülligen (CH)

(73) Assignee: ABB E-mobility B.V., Delft (NL)

( * ) Notice: Subject to any disclaimer, the term of this patent is extended or adjusted under 35 U.S.C. 154(b) by 0 days.

(21) Appl. No.: 17/884,008

(22) Filed: Aug. 9, 2022

(65) Prior Publication Data
US 2023/0049615 A1 Feb. 16, 2023

(30) Foreign Application Priority Data

Aug. 13, 2021 (EP) .................................... 21191279

(51) Int. Cl.
| | | |
|---|---|---|
| *H02M 7/797* | (2006.01) | |
| *H02M 7/493* | (2007.01) | |
| *H02M 7/757* | (2006.01) | |
| *H01F 30/12* | (2006.01) | |
| *H02J 3/38* | (2006.01) | |

(52) U.S. Cl.
CPC ........... *H02M 7/797* (2013.01); *H02M 7/493* (2013.01); *H02M 7/757* (2013.01); *H01F 30/12* (2013.01); *H02J 3/381* (2013.01)

(58) Field of Classification Search
CPC ...... H02M 7/493; H02M 7/797; H02M 7/757; H01F 30/12
See application file for complete search history.

(56) References Cited

U.S. PATENT DOCUMENTS

| 5,446,642 A | 8/1995 | McMurray | |
|---|---|---|---|
| 2013/0121043 A1* | 5/2013 | Pietkiewicz | .......... H02M 1/126 363/40 |

FOREIGN PATENT DOCUMENTS

| DE | 3826524 C2 | 3/1995 |
|---|---|---|
| WO | WO 2011/154040 A1 | 12/2011 |

OTHER PUBLICATIONS

European Patent Office, Extended European Search Report in European Application No. 21191279.5, 9 pp. (dated Feb. 4, 2022).

* cited by examiner

*Primary Examiner* — Jue Zhang
(74) *Attorney, Agent, or Firm* — Leydig, Voit & Mayer, Ltd.

(57) ABSTRACT

A multi-pulse line-interphase transformer converter includes an electric part that includes magnetic components configured to be connected to a three-phase AC grid, and an electric part that includes a multi-phase voltage system configured to be connected to a common DC capacitor. The electric part splits each AC grid phase n times into two phases, resulting in a plurality of intermediate phases at an internal interface, each intermediate phase corresponding to a pulse of the multi-pulse line-interphase transformer converter. The intermediate phases are connected to the multi-phase voltage system. The multi-phase voltage system comprises bridges with actively controlled switches. The bridges are connected in parallel to the common DC capacitor.

15 Claims, 19 Drawing Sheets

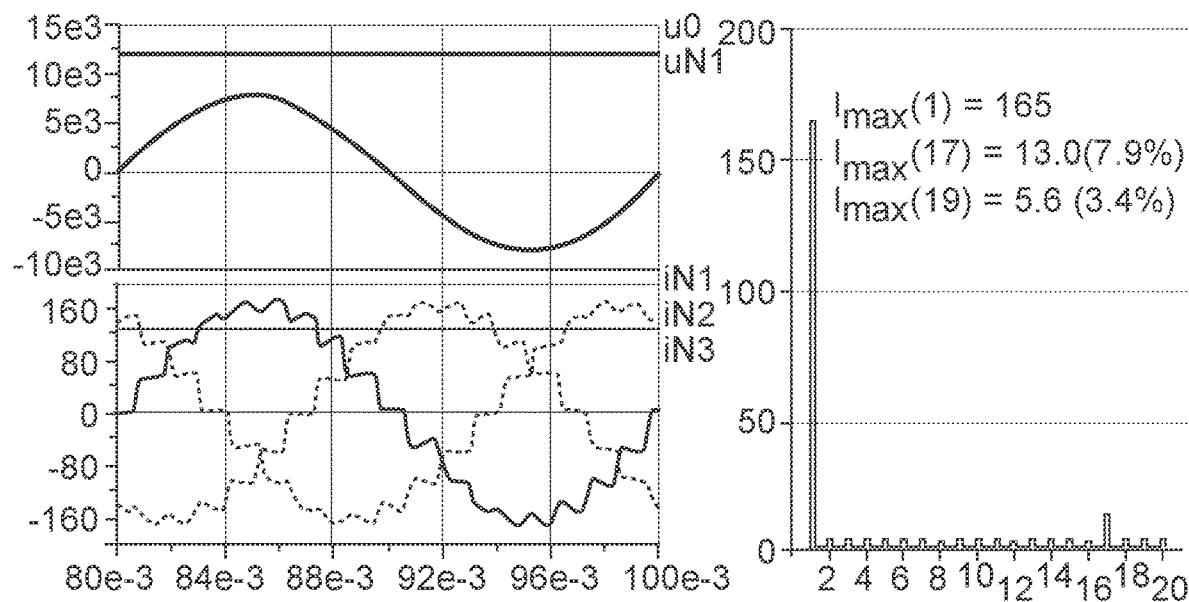
Fig. 2a
Fig. 2b
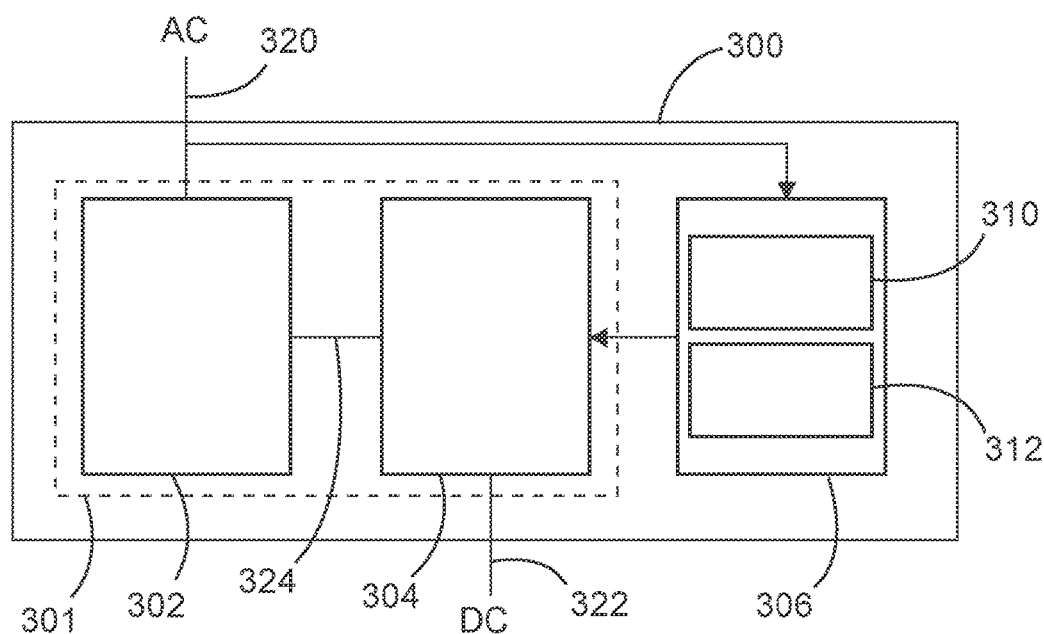
Fig. 3

BI-DIRECTIONAL LINE-INTERPHASE TRANSFORMER-BASED CONVERTER

CROSS-REFERENCE TO RELATED APPLICATIONS

This patent application claims priority to European Patent Application No. 21191279.5, filed on Aug. 13, 2021, which is incorporated herein in its entirety by reference.

FIELD OF THE DISCLOSURE

The present disclosure relates to a multi-pulse line-interphase transformer converter and associated control unit for use in a BESS (battery energy storage system), a drive frontend (also wind energy), a PV solar, an MVDC transmission, fuel cell interface, EV charging and/or a datacenter.

BACKGROUND OF THE INVENTION

State-of-the-art solutions for AC/DC converters connected directly to a MV grid are e.g. Modular Multi-Level Converters (MLC), two-, three- and multi-level converters, thyristor-converters and multi-pulse diode rectifiers. In Modular Multi-Level Converters (MMC), the voltage stress is distributed equally over series-connected cells, where each cell contains low-voltage semiconductors. For voltage balancing, a capacitor for each cell is required, which also requires a control scheme to keep the capacitors loaded. A main limitation is its inability to operate at low frequency and high current which means that it cannot be used for certain drive applications. With multi-level topologies like three-level converters one can employ lower voltage rated semiconductors, resulting in higher switching frequency and lower cost, but gets higher complexity with increased cost in mechanics, gate drivers, and sensor electronics. Thyristor converters are very robust and low cost, and can be bi-directional (either by inverting the DC link, or, alternatively, by having two anti-parallel thyristors), and allow step-down voltage control of the DC link, but do not fulfil the harmonic grid standards. Diode rectifiers are typically connected via a 50/60 Hz transformer, which is simple, robust and low-cost. The DC link voltage is not controllable. In order to fulfill harmonic standards, several diode bridges can be operated together with a multi-pulse transformer. The main disadvantage is the requirement for a large and heavy 50/60 Hz transformer.

BRIEF SUMMARY OF THE INVENTION

In one general aspect, the present disclosure relates to a bi-directional converter.

The described embodiments similarly pertain to the multi-pulse line-interphase transformer converter, the control unit and the use of a line-interphase transformer. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

In this disclosure, the following abbreviations are used:
MV Medium voltage (typically 10 kV-50 kV)
LV Low voltage (typically 200 V-1 kV)
LIT Line-Interphase-Transformer (provides phase-shifted three-phase systems without galvanic insulation)
BESS Battery energy storage system
MMC Modular Multi-Level Converters
MVDC Medium voltage direct current

BRIEF DESCRIPTION OF THE SEVERAL VIEWS OF THE DRAWING(S)

FIG. 3 shows a block diagram of the line-interphase transformer converter according to an embodiment of the present disclosure.

FIG. 2a shows the DC-voltage, sinusoidal AC grid voltage, and the three grid currents of an 18-pulse LIT based rectifier/converter in accordance with the disclosure.

FIG. 2b shows the spectrum of the 18-pulse LIT based rectifier/converter in accordance with the disclosure.

FIG. 4b shows the spectrum of the 18-pulse LIT based rectifier/converter of FIG. 4a.

FIG. 9 shows the Grid voltages (phase to ground) $u_{Ni}$, signals $q_{jk}$ and switching of the 18-pulse LIT converter of FIG. 4a.

FIG. 10 shows grid voltages $u_{Ni}$, converter input currents $i_{Ni}$ in inverter operation, emulated signals $q_{j1}$ of one bridge vs. its AC input voltage of one leg $u_1 = \varphi_{11}$, and switching signals of the 18-pulse LIT converter of FIG. 4a.

DETAILED DESCRIPTION OF THE INVENTION

Figures 1A, 1B:
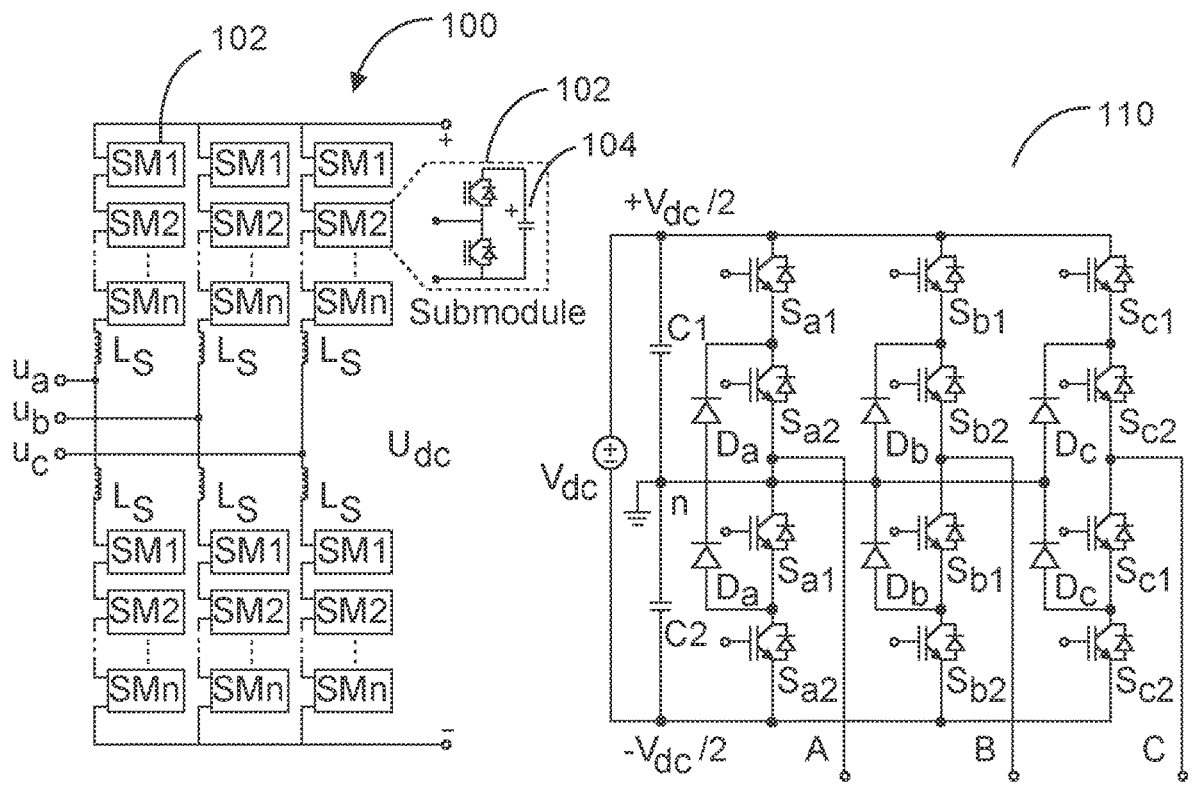
FIG. 1a shows a diagram of a Modular Multi-Level Converter (MMC) in accordance with the disclosure.
FIG. 1b shows a diagram of a three-level converter in accordance with the disclosure.

In Modular Multi-Level Converters (MMC) 100, see FIG. 1a, the voltage stress is distributed equally over series-connected cells, where each cell contains low-voltage semiconductors. For voltage balancing, a capacitor 104 for each cell is required which also requires a control scheme to keep the capacitors 104 loaded.

The cell semiconductors can be switched in the range of the mains frequency in a step-wise way so that the sinusoidal mains voltage is approximated (advantage: low harmonics, low switching losses; as an disadvantage, large capacitors are required. Alternatively, the cell semiconductors can be switched in a PWM scheme with all cells switching at the same time with a frequency much higher than mains frequency, which has the advantage of requiring much smaller capacitors; and the disadvantage of large harmonics, high du/dt, and high switching losses.

The MMC 100 provides low harmonics, bi-directional energy flow and a DC link with controllable voltage (step-up type) at relatively high cost. A main limitation is its inability to operate at low frequency and high current which means it cannot be used for certain drive applications. Employing semiconductors rated for accordingly high voltage allows to realize simple two-level converters. Such semiconductors produce high switching losses in PWM mode which limits the switching frequency and increases the harmonics. As with MMC, bi-directional energy flow and a DC link with controllable voltage (step-up type only) is provided. Employing high-voltage power semiconductors typically results in high cost. Other than MMC, two-level converters can provide high current at low frequency, which is required for many drive applications.

With multi-level topologies like three-level converters 110 as shown in FIG. 1b, one can employ lower voltage rated semiconductors, resulting in higher switching frequency and lower cost, but gets higher complexity with increased cost in mechanics, gate drivers, and sensor electronics. Same as for the two-level converter, multi-level topologies 110 can provide bi-directional energy flow and a DC link with controllable voltage (step-up type), and also high current at low frequency, but it can be easier to fulfill harmonic grid standards for a required efficiency.

Thyristor converters are very robust and low cost, and can be bi-directional (either by inverting the DC link, or, alternatively, by having two anti-parallel thyristors), and allow step-down voltage control of the DC link, but do not fulfil the harmonic grid standards (additional bulky and expensive filters required) and required reactive power (huge amounts of reactive power in certain operating states). They can provide high current at low frequency which makes them suitable for drives although due to their high low-frequency harmonics they became obsolete in many applications.

The converter topologies discussed above are useful where bi-directional and/or DC-to-AC energy flow is required, which are, e.g., BESS, drives, PV solar, MVDC transmission, fuel cell, or EV charging (and datacenters) if grid-support is required.

In case of unidirectional AC-to-DC energy flow, rectifiers are sufficient. Typical applications are EV charging and datacenters (when no grid-support is required), and industry processes like e.g., H2-production or electrolysis.

Diode rectifiers are typically connected via a 50/60 Hz transformer, which is simple, robust and low-cost. The DC link voltage is not controllable. In order to fulfill harmonic standards, several diode bridges can be operated together with a multi-pulse transformer (typically 12-pulse transformer for many MV applications, e.g. front end for MV-drives). The main disadvantage is the requirement for a large and heavy 50/60 Hz transformer.

Figure 1C:
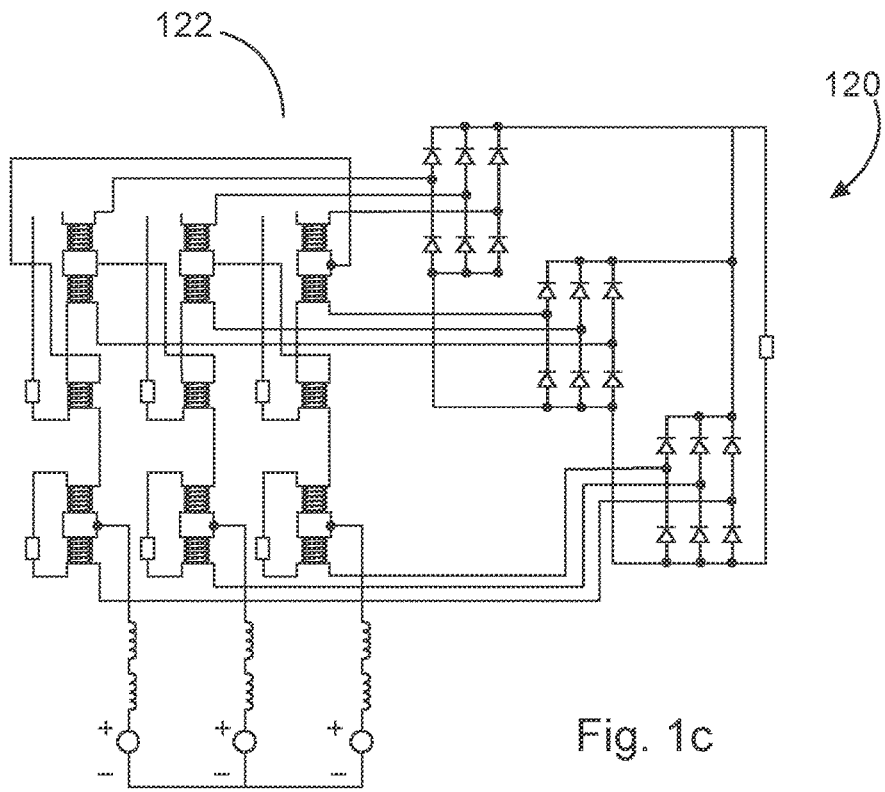
FIG. 1c shows an 18-pulse line-interphase transformer (LIT) based rectifier/converter in accordance with the disclosure.

An alternative is to employ a line-interphase transformer-based diode rectifier 120, as shown in FIG. 1c where the LIT 120 is by an order of magnitude smaller (and accordingly cost-reduced) than a multi-pulse 50/60 Hz transformer, and low-cost diode bridges provide currents which fulfil the harmonic standards of the grid (see FIG. 2a and FIG. 2b). This is a low-cost solution of highest power density and without galvanic insulation, where the DC link voltage is not controllable and the diodes face the full MV voltage, although at low current.

Figure 4A:
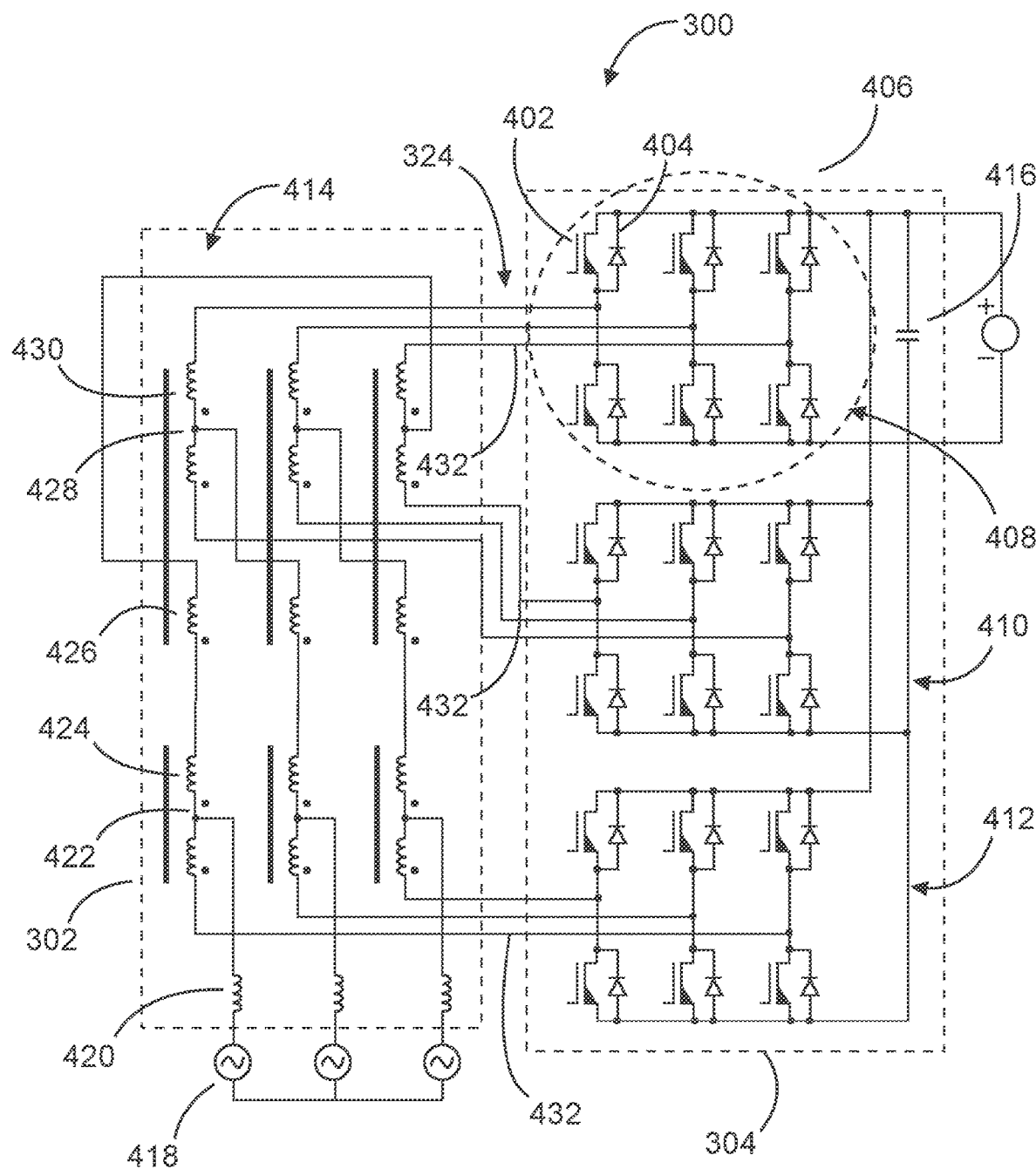
FIG. 4a shows an 18-pulse line-interphase transformer converter with switches according to an embodiment of the disclosure.

FIG. 4a depicts an example of a line-interphase transformer converter 300. The diagram shows an 18-pulse line-interphase transformer converter according to an embodiment with switches 402 for controlling bi-directional energy flow. LITs are here generally understood as a setup of magnetic components, which have three-phase AC grid 418 at the input side and provide several symmetrically phase-shifted three-phase voltage systems or bridge arrangements 408, 410, 412 at their output side.

The multi-pulse rectifier shown in FIG. 4a provides negligible switching losses, high efficiency, is simple and extremely compact and can be produced at low cost. It is further bi-directional and has the ability to provide high current at low frequency. This converter topology provides therefore a low-cost solution of highest power density for all applications where, for example, bi-directionality and/or DC-to-AC energy flow is required.

FIG. 3 gives a generalized overview of the line-interphase transformer converter 300, which applies to all embodiments in this disclosure using a block diagram. The LIT 300 comprises a converter 301 and a control unit 306. The converter 301 comprises a magnetic part 302 and an electric part 304, which are connected to each other by the internal interface 324. The magnetic part 302 has an external AC-interface 320 to, e.g., the AC grid, and the electric part 304 has an external DC-interface 322. The electric part 304 is controlled by the control unit 306. The control unit 306 comprises a signal processing unit 310 and a controller 312. The signal processing unit 310 mainly emulates signals as described in detail below and the controller 312 generates control signals for the switchable components of the electric part 304. The signal processing unit and the controller 312 may be seen as functional blocks. That is, the functionality may be implemented on the same or on separate hardware. For example, the signal processing and the generation of the control signals may both be implemented on an FPGA and supporting circuits, or, in another example, the signal processor may be a DSP and the generation of control signals may be implemented on a separate processing or logic units and may comprise analog elements. The hardware may further comprise one or more memories to store logic instructions and/or values such as a pre-defined configuration as input values for the processing.

As shown in 4a, the multi-pulse line interphase transformer converter 300 comprises magnetic part 302 and electric part 304 comprising bridge arrangements 408, 410, 412. The AC phases 418 are connected via an inductor 420 to the center 422 of first coils 424 that split the phases once. The lower ends are connected to the center of the legs in the lower bridge arrangement 412. The upper ends of the first coils 424 are connected via an inductor 426 to center taps 428 of further coils 430. The ends of these second coils 430 are connected to the center of the bridge legs in the middle bridge arrangement 410 and of the upper bridge arrangement 408. These connections of the internal interface 324 are also designated "intermediate phases" 432. All three bridge arrangements 408, 410, 412 are connected in parallel to the common capacitor 416. Note, that inductors 426 between the coils 424, 430 are magnetically coupled to the coils of one of the neighboring AC phase branches. Since the signals are split twice, i.e., n=2, n+1 coil ends (each split results in one additional phase) are connected to the voltage systems 408, 410, 412, i.e., the electric part, and therefore 18 switches are necessary, and 18 pulses are obtained. The bridges employ switches 402, which can be actively switched off, and which are antiparallel to the bridge's rectifier diodes 404, and where all bridges 406 are parallel connected to a common DC link. The switches 402 may preferably be electronic switches such as IGBTs or MOSFETs. In case of active switches such as SiC-MOSFETs, the body diodes of such switches provide rectifier operation.

Figure 4B:
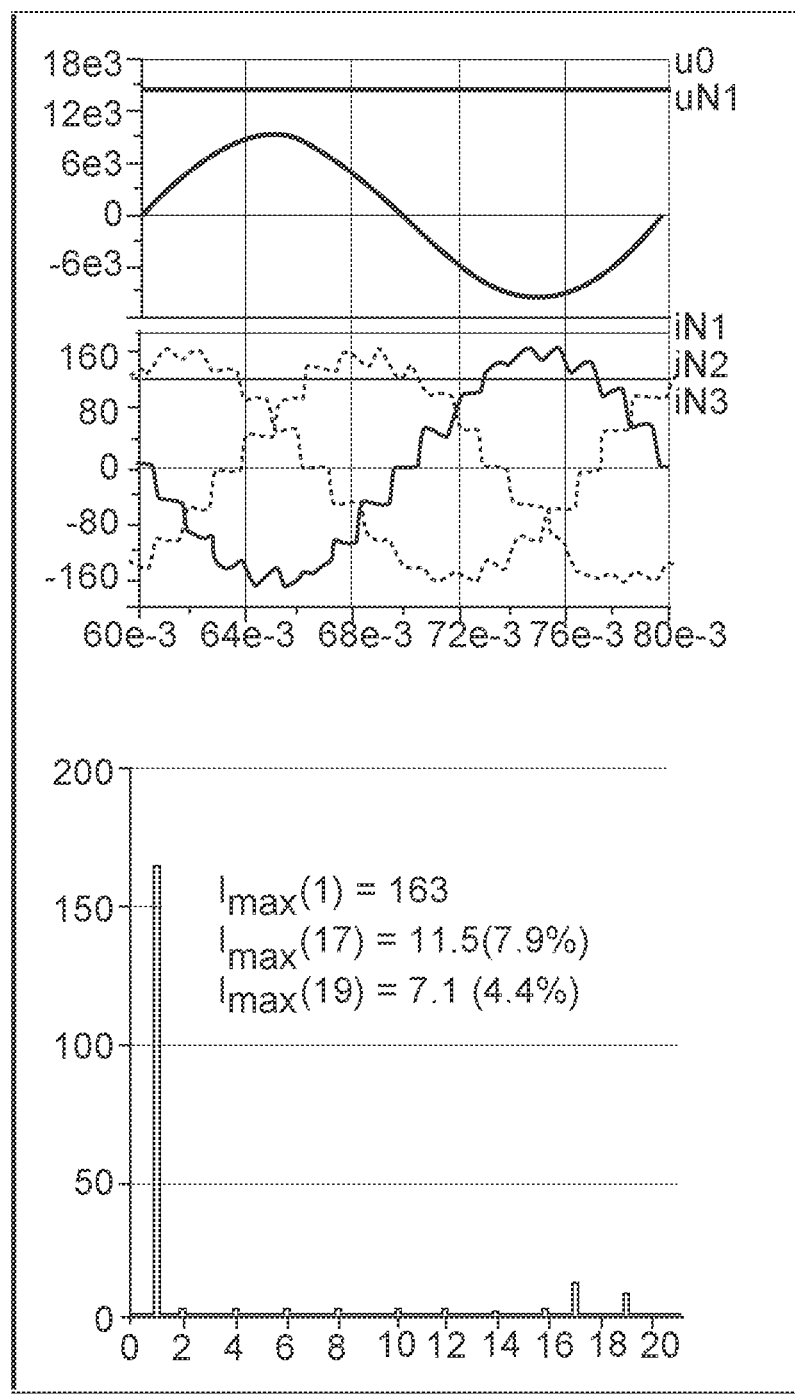

FIG. 4b shows the grid voltage, and the three grid currents of the 18-pulse LIT based converter in inverter-mode, where the energy flows from DC to AC. The DC-voltage is the constant line, and the AC is sinusoidal. The grid currents depicted in the lower part of FIG. 4b show the typical shape of currents in an 18-pulse LIT. The right part of FIG. 4b shows the spectrum of the currents. As in rectifier mode, also for inverter energy flow the 18-pulse LIT blocks all low frequency harmonics but the 17th and 19th, and multiples of these.

Figure 5:
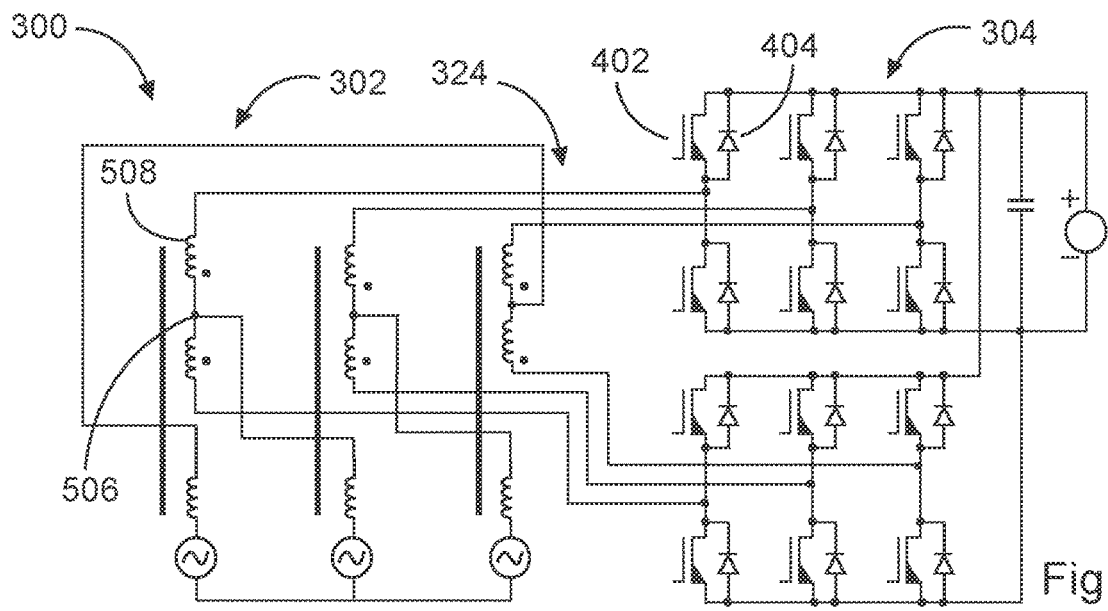
FIG. 5 shows a 12-pulse line-interphase transformer converter with switches according to an embodiment of the disclosure.

FIG. 5 shows a diagram of a 12-pulse line-interphase transformer converter as an embodiment of the LIT 300 with electronic switches 402. There is one split 506 in the magnetic part in each AC branch, resulting in (n+1)×3=6 connections at the internal interface 324 between the electric 304 and the magnetic 302 part, and thus in 12 switches 402 and also in 12 pulses.

Figure 6:
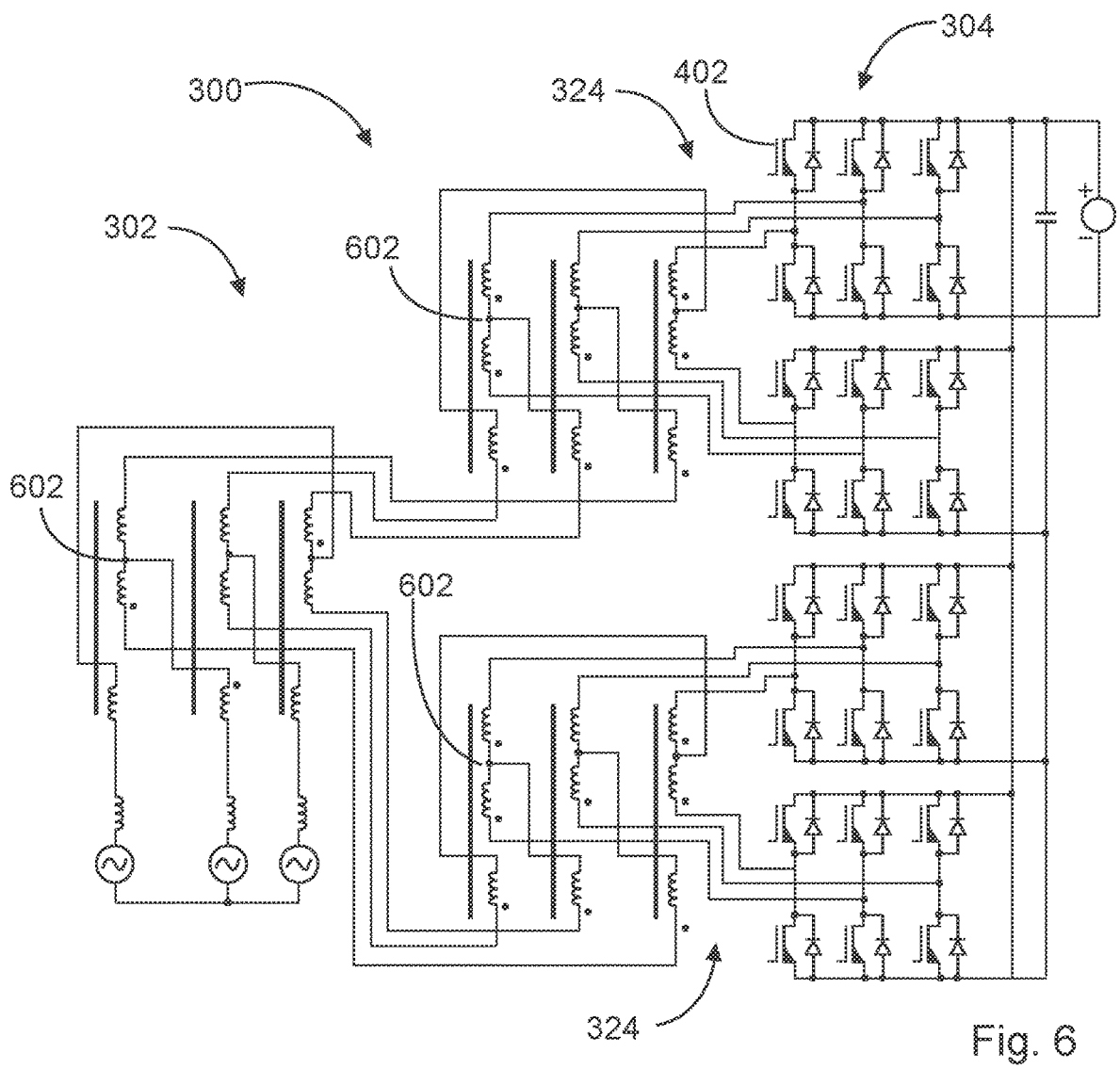
FIG. 6 shows a 24-pulse line-interphase transformer converter with switches according to an embodiment of the disclosure.

FIG. 6 shows a diagram of a 24-pulse line-interphase transformer converter with switches 402 as an embodiment of the LIT 300. There are three splits, collectively numbered 602 in FIG. 6, in the magnetic part in each AC branch, resulting in (n+1)×3=12 connections at the internal interface between the electric 304 and the magnetic part 302, and thus in 24 switches 402 and also in 24 pulses.

Similarly, further converters with a higher number of pulses can be implemented, e.g., with 48 switches and 48 pulses.

The presented converters have the characteristics that they provide bi-directional operation of the converter with approximately sinusoidal grid currents. They can be realized at low cost, and are simple, reliable and robust while providing a very high efficiency in rectifier- and in inverter-mode. The switches 402 switch with mains frequency and therefore, the switching losses are negligible, resulting further in high efficiency and low cooling effort. If each switch 402 is composed as multi-cell structure with series connected low-voltage IGBTs, the losses in a required voltage balancing network are very small as well. Moreover, the coordinated switching becomes less time-critical. These characteristics are further supported by the control scheme described below.

In one embodiment, IGBTs with antiparallel diodes in the same package can be employed, or MOSFETs, where the internal body diode can provide rectifier operation. If the power flow in rectifier- and inverter-operation is different, e.g., in a drive, which is mainly driving the motor and only sometimes feeding back energy, the die sizes of switch and anti-parallel diode can be individually optimized to keep cost at minimum.

In the following, a general control scheme of the active switches 402 in inverter operation is described, which may be applied to converter topologies where a multi-pulse line interphase transformer converter 300 has connections to bridges 406 as in the topologies presented above, that employ switches 402, which can be actively switched off, and which are antiparallel to the bridge's rectifier diodes 404, and where all bridges 406 are parallel-connected to a common DC link 416.

Figure 7:
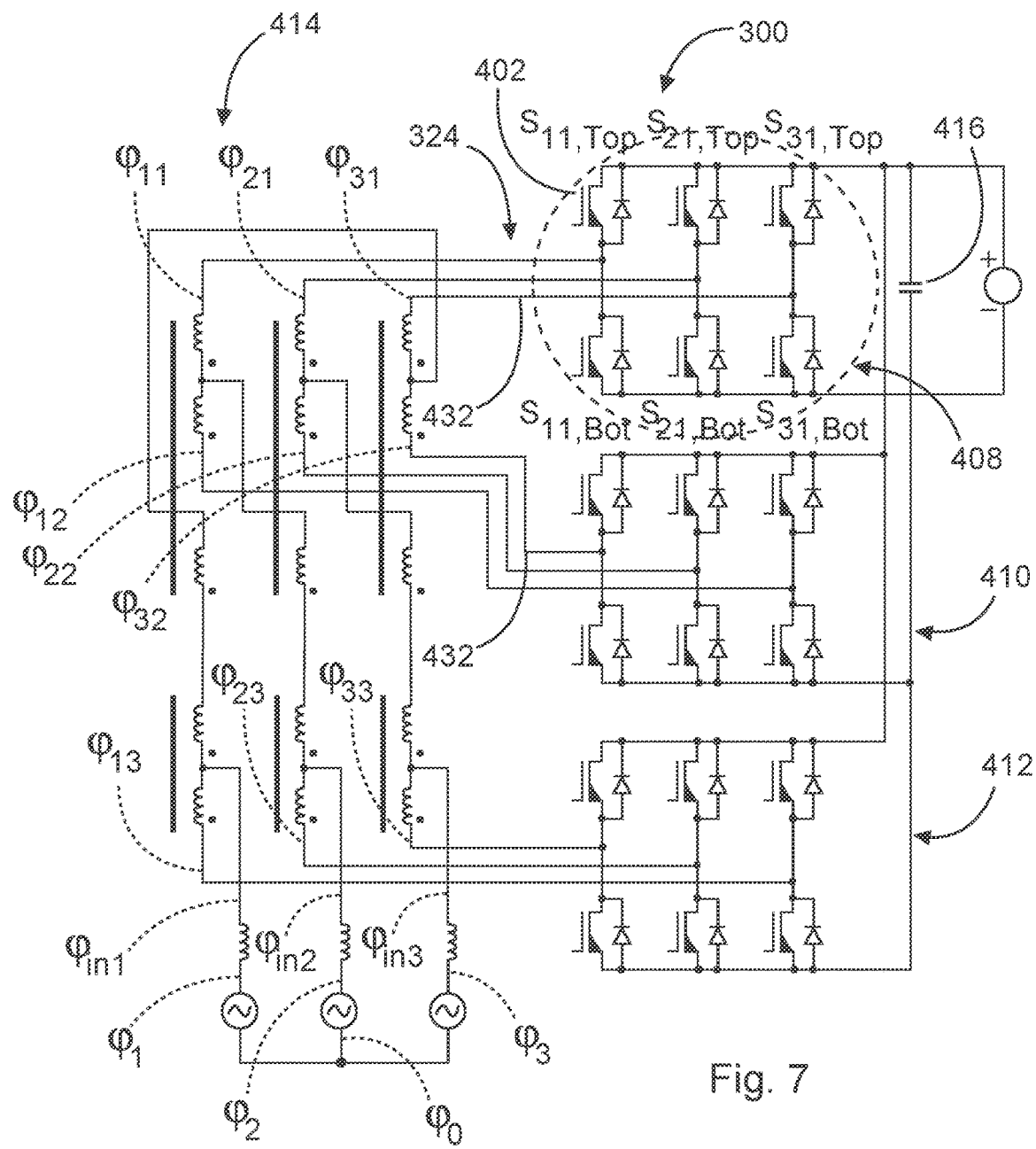
FIG. 7 shows the 18-pulse line-interphase transformer converter of FIG. 4a with designations of potentials and switches in accordance with the disclosure.

FIG. 7 shows a diagram of an 18-pulse line-interphase transformer 300 based rectifier with switches 402 for controlling bi-directional energy flow, corresponding to the LIT 300 shown in FIG. 4a. Compared to FIG. 4a, in FIG. 7 the potentials φ are depicted and, e.g., the switches of the upper bridges 408 are designated with $S_{ij}$, position, wherein i corresponds to an AC phase 414, and j corresponds to the bridge arrangement; e.g. j=1 addresses the upper bridge arrangement 408, "Top" or "Bot" (bottom) is the position inside the bridge, wherein a top switch $S_{Top}$ is connected to the positive pole of the capacitor 416, and a bottom switch $S_{Bot}$ is connected to the negative pole of the capacitor 416. The numbering of the potentials $\varphi_{ij}$ is correspondingly, such that i corresponds to an AC phase branch 414, and j corresponds to the bridge arrangement a coil end is connected to.

The converter may comprise a control unit 306, which may comprise a signal processor 310 and a controller 312. The signal processor 310 may be configured to emulated a signal based on a measurement of an AC voltage at the external interface 322 to the grid, and the controller 312 may be configured to generate a signal for the switches 402 based on the emulated signal. The implementation is explained in more detail in the following.

Figure 8:
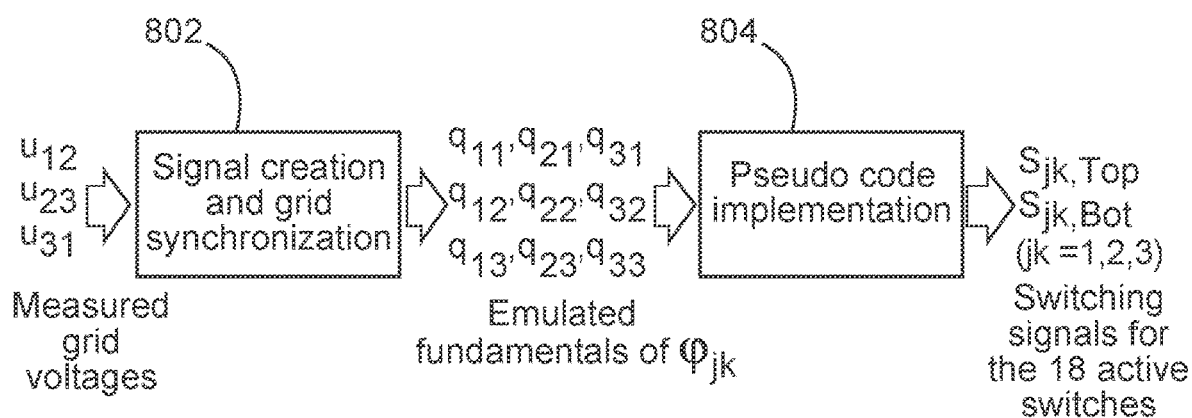
FIG. 8 shows the signal processing and generation of switching signals, of the 18-pulse line-interphase transformer converter of FIG. 4a and FIG. 7.

Referring to FIGS. 3, 4a and 8, the preferred implementation of the presented control strategy is characterized by measuring the three-phase input voltages of the LIT 300 at the grid side 418, that is, between grid-side inductor 420 and LIT terminals, and by creating three sinusoidal signals per bridge (e.g. 9 signals for the 18-pulse LIT converter) based on this measurement, e.g. using the signal processing circuit 310, wherein the creating is performed by the signal processor 310 emulating the normalized fundamentals of the AC input voltages of the three bridge arrangements 408, 410, 412. These created signals are characterized and/or defined by fixed pre-calculated phase angles and are synchronized with the measured three-phase voltages. That is, instead of measuring, filtering and/or calculating, and employing the required voltage fundamentals directly from the bridge AC inputs at the internal interface 324, these created signals are employed to make the switching decisions.

A small phase-angle delay may be added to all created signals in order to improve synchronization of the signals with the grid voltages and/or to compensate the small phase shift due to the stray inductances of the interphase transformer and/or the grid side impedance, where this small phase-angle is derived from measured low-frequency harmonics of the grid currents.

The control strategy is characterized by the upper active switch $S_{Top}$ of each bridge 406 being in on-state as long as the related emulated signal of its bridge leg is higher than both of the emulated signals of the other two phase legs, and by actively switching this switch into off state when the related emulated signal of its bridge leg becomes lower than one of the two emulated signals of the other two phase legs; while each lower active switch $S_{Bot}$ of each bridge being in on-state as long as the related emulated signal of its bridge leg is lower than both of the emulated signals of the other two phase legs, and by actively switching this switch into off state when the related emulated signal of its bridge leg becomes higher than one of the two emulated signals of the other two phase legs.

With the control scheme presented herein, the switches 402 switch with mains frequency and the switching losses are negligible. Furthermore, if each switch is composed as multi-cell structure with series connected low-voltage IGBTs, the losses in an optionally required voltage balancing network are very small as well.

The following pseudo-code for the switching signals of the active switches 402 for bi-directional energy flow describes the presented control scheme in detail. The sinusoidal signals $q_{jk}$ are created by a signal processing circuit and emulate the fundamentals of the normalized AC input voltages of the bridges, which are defined as the potentials $\varphi$ with respect to ground $\varphi_0$ as defined in FIG. 7 for an 18-pulse converter and shown in FIG. 8. The boxes in FIG. 8 contain signal processing electronics. The grid voltages are measured from the potential differences of the LIT input nodes $\varphi_{in,j}$ in FIG. 7 and/or from these input potential to ground (e.g. by artificial star point).

With the definitions of the potentials in FIG. 7 and the assumption that the grid voltage fundamentals are defined (especially concerning their phase relations) as $$u_1 = \varphi_1 - \varphi_0 = \hat{u}_N \sin(\omega t)$$

$$u_2 = \varphi_2 - \varphi_0 = \hat{u}_N \sin(\omega t - 2\pi/3)$$

$$u_3 = \varphi_3 - \varphi_0 = \hat{u}_N \sin(\omega t - 2\pi/3)$$

and $$u_{12} = u_2 - u_1$$

$$u_{23} = u_3 - u_2$$

$$u_{31} = u_3 - u_1,$$

the sinusoidal signals $q_{jk}$ are created by the signal processing electronics (block 802 in FIG. 8), which also continuously measures at least one grid voltage for synchronization, as $$q_{jk} = \sin(\omega t + \theta_{jk})$$

with k=1, 2, 3 and j=1, 2, 3 and with the pre-defined angles $$\theta_{11} = -7\pi/9, \theta_{21} = +5\pi/9, \theta_{31} = -7\pi/9$$

$$\theta_{12} = -5\pi/9, \theta_{22} = +7\pi/9, \theta_{32} = +7\pi/9$$

$$\theta_{13} = 0, \theta_{23} = -2\pi/3, \theta_{33} = +2\pi/3$$

Then, we get in very good approximation $$q_{1k} = \varphi_{1k(1)}, q_{2k} = \varphi_{2k(1)}, q_{3k} = \varphi_{3k(1)}$$

With this we can define the switching pattern:
 if $q_{1k} > q_{2k}$ and $q_{1k} > q_{3k}$ then $S_{1k,Top}$=on else $S_{1k,Top}$=off
 if $q_{2k} > q_{3k}$ and $q_{2k} > q_{1k}$ then $S_{2k,Top}$=on else $S_{2k,Top}$=off
 if $q_{3k} > q_{1k}$ and $q_{3k} > q_{2k}$ then $S_{3k,Top}$=on else $S_{3k,Top}$=off
 if $q_{1k} < q_{2k}$ and $q_{1k} < q_{3k}$ then $S_{1k,Bot}$=on else $S_{1k,Bot}$=off
 if $q_{2k} < q_{3k}$ and $q_{2k} < q_{1k}$ then $S_{2k,Bot}$=on else $S_{2k,Bot}$=off
 if $q_{3k} < q_{1k}$ and $q_{3k} < q_{2k}$ then $S_{3k,Bot}$=on else $S_{3k,Bot}$=off
 for k=1,2,3

The presented control scheme makes the switching decisions based on the comparison of the emulated fundamental harmonics of the individual bridge AC input voltages, not on the voltages directly and not on the grid voltages. This is one key characteristic of the presented control scheme. Employing filtered and/or calculated voltages directly measured at the AC inputs of the bridges results in severe instability of the control for the LIT based multi-pulse converter.

The other key characteristic is that the upper switch must be actively switched off as soon as the related emulated fundamental is not any more of larger value than both of the other two emulated fundamentals (and accordingly for the lower switch, see pseudo-code). Therefore, replacing the active switch 402 with a thyristor does not work.

Figure 9:
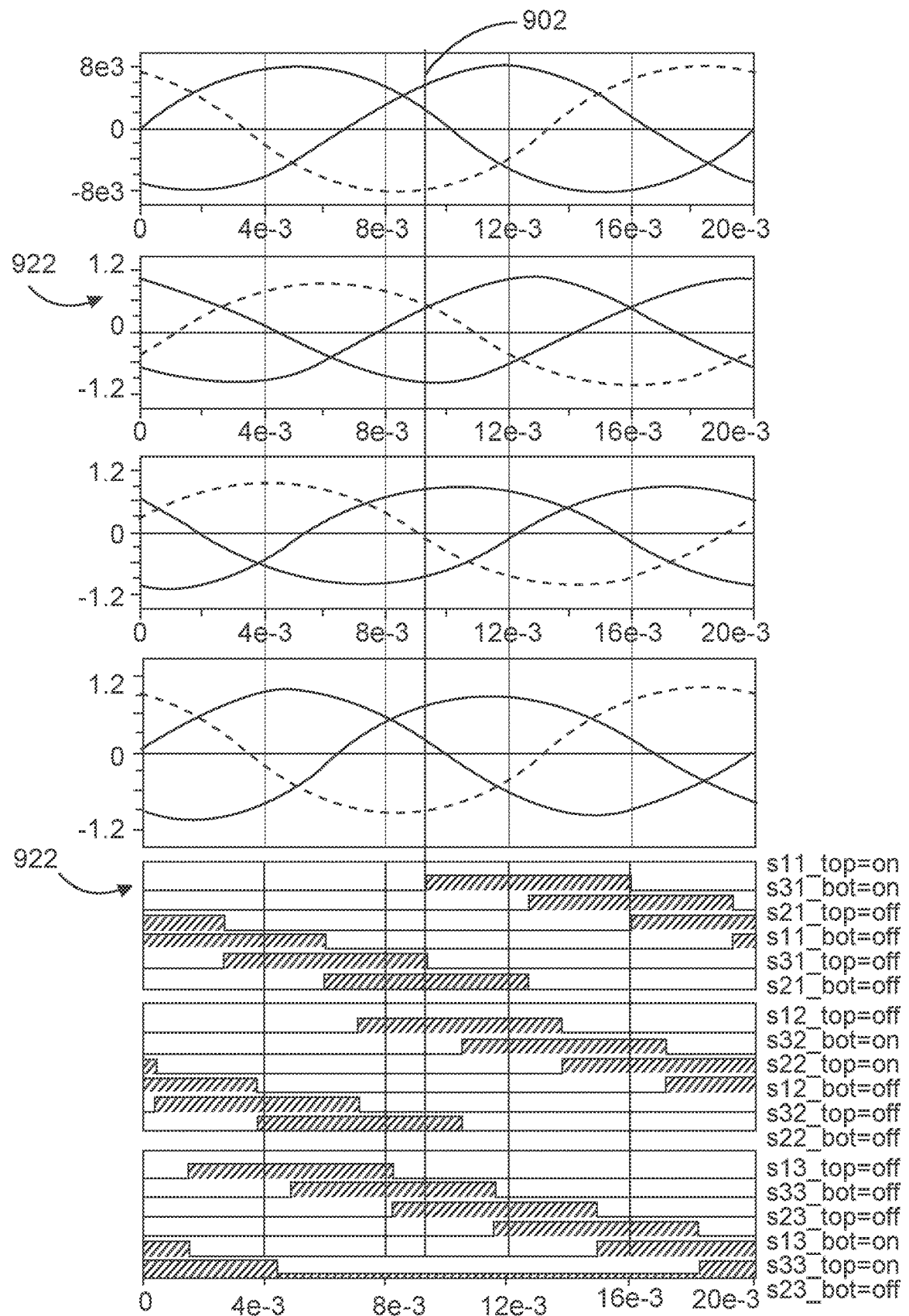

FIG. 9 shows the grid voltages (phase to ground) $u_{Ni}$, signals $q_{jk}$ and switching signals for an 18-pulse LIT converter. For example, line 902 shows the switching-on of signal $S_{11\_top}$ when $q_{11}$ in diagram 912 gets higher than $q_{11}$ and $q_{31}$. $S_{31\_bot}$ switches on, when $q_{31}$ in diagram 912 gets lower that $q_{11}$ and $q_{21}$. The same applies correspondingly to the further 16 signals. The horizontal scale is the time in seconds. The frequency is 50 Hz. The vertical scale is the normalized voltage such that the amplitudes are in the range between −1 and 1. Further, the phase differences as stated above between the grid voltages and the emulated signals can be identified, which is, for example 0.78×10⁻³ corresponding to a phase difference of −7π/9 for $u_{N1}$ and $q_{11}$.

Figure 10:
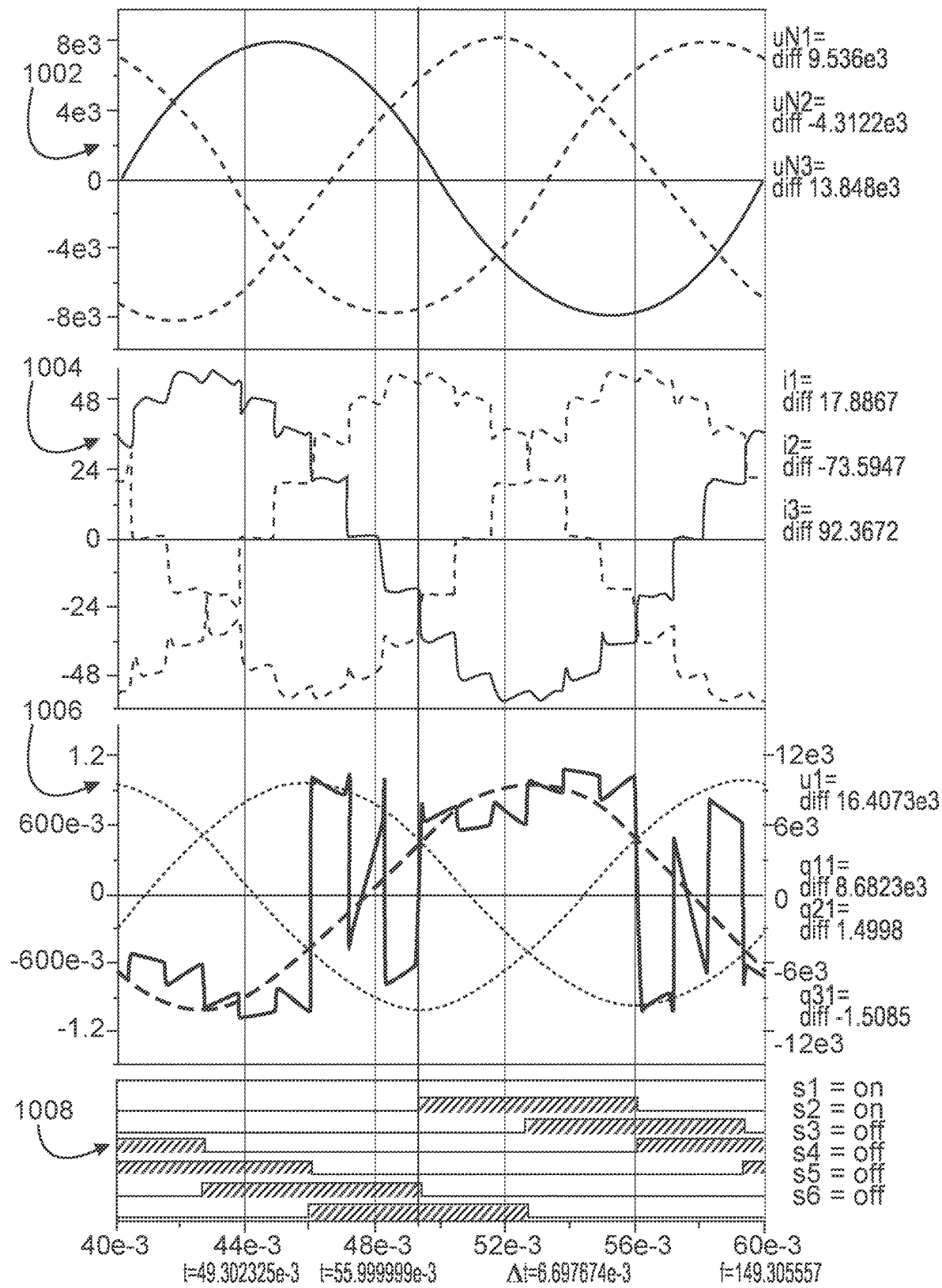

FIG. 10 shows in diagram 1002 grid voltages (phase to ground) $u_{Ni}$, in diagram 1004 converter input currents $i_{Ni}$ in inverter operation, in diagram 1006 signals $q_{j1}$ emulating fundamental AC input voltages of one bridge vs. its AC input voltage of one leg $u_1 = \varphi_{11}$, and in diagram 1008 switching signals for an 18-pulse LIT converter. It can be seen that the bridge AC input voltage $u_1 = \varphi_{11}$ is so heavily distorted that it cannot be employed for switching signal generation. Keeping the control continuously "on" also in rectifier operation allows preventing DC link over-voltages in case of sudden loss of the load (e.g. tripping of a next-stage converter).

In the following, the converter topology is described for an application in 12-Pulse and 24-pulse systems. Generally, for 12- and 24-pulse systems the switching decisions are defined as if $q_{jk}>q_{jk}$ and $q_{jk}>q_{jk}$ then $S_{jk,Top}$=on else $S_{jk,Top}$=off
if $q_{jk}>q_{jk}$ and $q_{jk}>q_{jk}$ then $S_{jk,Bot}$=on else $S_{jk,Bot}$=off
with $q_{jk}=\varphi_{jk(1)}$
for j=1, 2, 3 and
for k=1, 2 for the 12-pulse system
and/or for k=1, 2, 3, 4 for the 24-pulse system For the 12- and 24-pulse system, with the definitions of the potentials in FIG. 9 and FIG. 10, and with the assumption that the grid voltage fundamentals are defined (especially concerning their phase relations) as $$u_1 = \varphi_1 - \varphi_0 = \hat{u}_N \sin(\omega t)$$

$$u_2 = \varphi_2 - \varphi_0 = \hat{u}_N \sin(\omega t - 2\pi/3)$$

$$u_3 = \varphi_3 - \varphi_0 = \hat{u}_N \sin(\omega t - 2\pi/3)$$

and $$u_{12} = u_2 - u_1$$

$$u_{23} = u_3 - u_2$$

$$u_{31} = u_3 - u_1,$$

the sinusoidal signals $q_{jk}$ are created by the signal processing electronics (block 802 in FIG. 6), which also continuously measures at least one grid voltage for synchronization, as $$q_{jk} = \sin(\omega t + \theta_{jk})$$

For the 12-pulse system the required phase angles are $$\theta_{11} = -3\pi/4, \theta_{21} = +7\pi/12, \theta_{31} = -\pi/12,$$

$$\theta_{12} = -7\pi/12, \theta_{22} = +3\pi/4, \theta_{32} = +\pi/12$$

For the 24-pulse system the required phase angles are $$\theta_{11} = +97.5\pi/180, \theta_{21} = -22.5\pi/180, \theta_{31} = -142.5\pi/180,$$

$$\theta_{12} = +127.5\pi/180, \theta_{22} = +7.5\pi/180, \theta_{32} = -112.5\pi/180,$$

$$\theta_{13} = +112.5\pi/180, \theta_{23} = -7.5\pi/180, \theta_{33} = -127.5\pi/180,$$

$$\theta_{14} = +142.5\pi/180, \theta_{24} = +22.5\pi/180, \theta_{34} = -97.5\pi/180,$$

Figure 11:
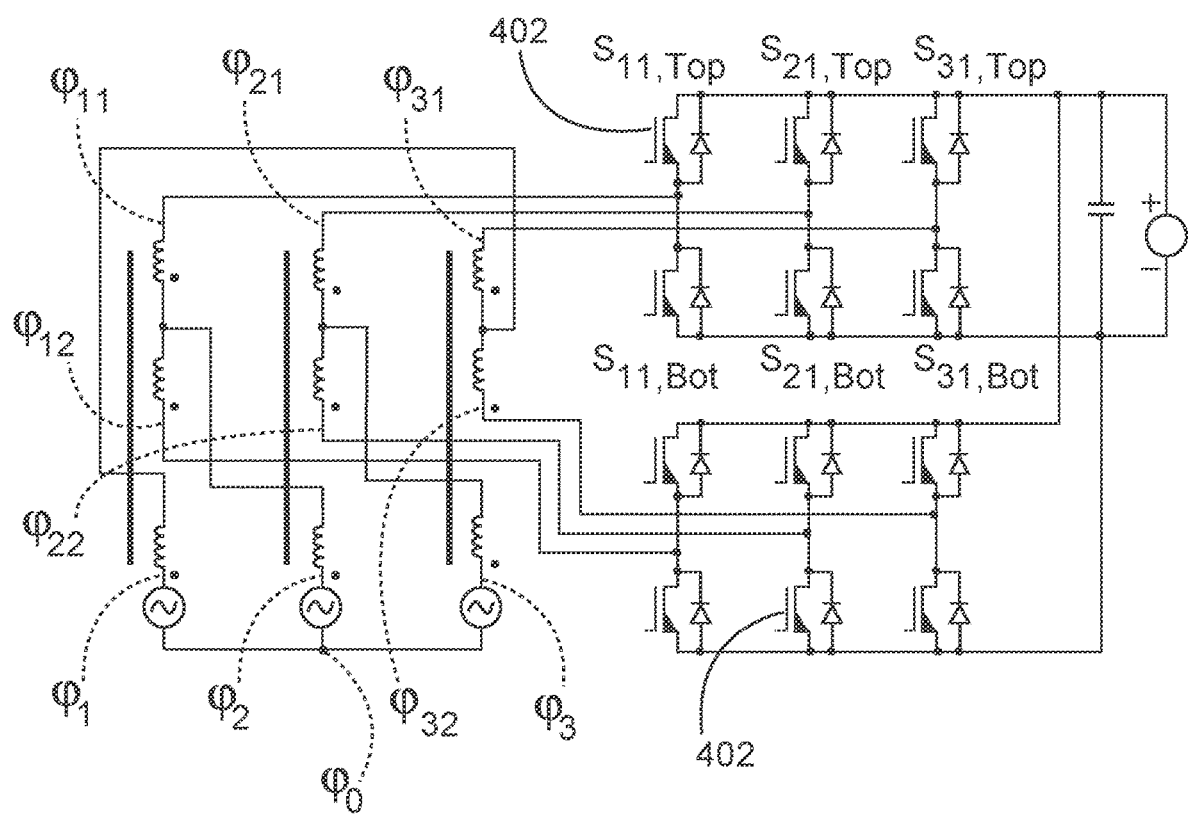
FIG. 11 shows a 12-pulse line-interphase transformer based rectifier/converter with switches for controlling bi-directional energy flow.

FIG. 11 shows a 12-pulse line-interphase transformer based rectifier with switches for controlling bi-directional energy flow as an embodiment of the LIT 300. The topology corresponds to that of FIG. 5. The principle of the designation of the potentials and the switches corresponds to that described for FIG. 7.

Figure 12:
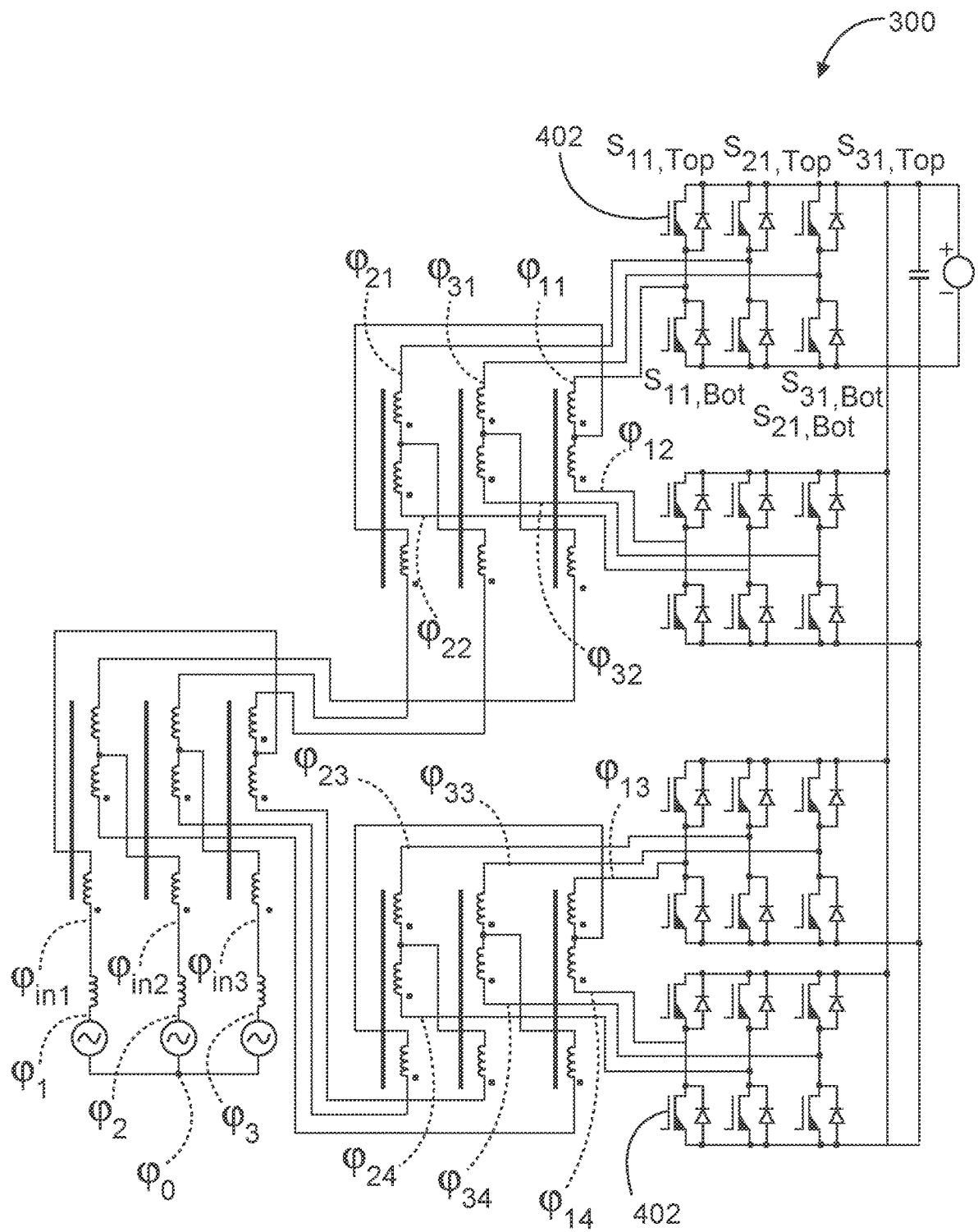
FIG. 12 shows a 24-pulse line-interphase transformer based rectifier/converter with switches for controlling bi-directional energy flow in accordance with the disclosure.

FIG. 12 shows a 24-pulse line-interphase transformer based rectifier with switches 402 for controlling bi-directional energy flow as an embodiment of the LIT 300. The topology corresponds to that of FIG. 6. The principle of the designation of the potentials and the switches corresponds to that described for FIG. 7.

Figure 13A:
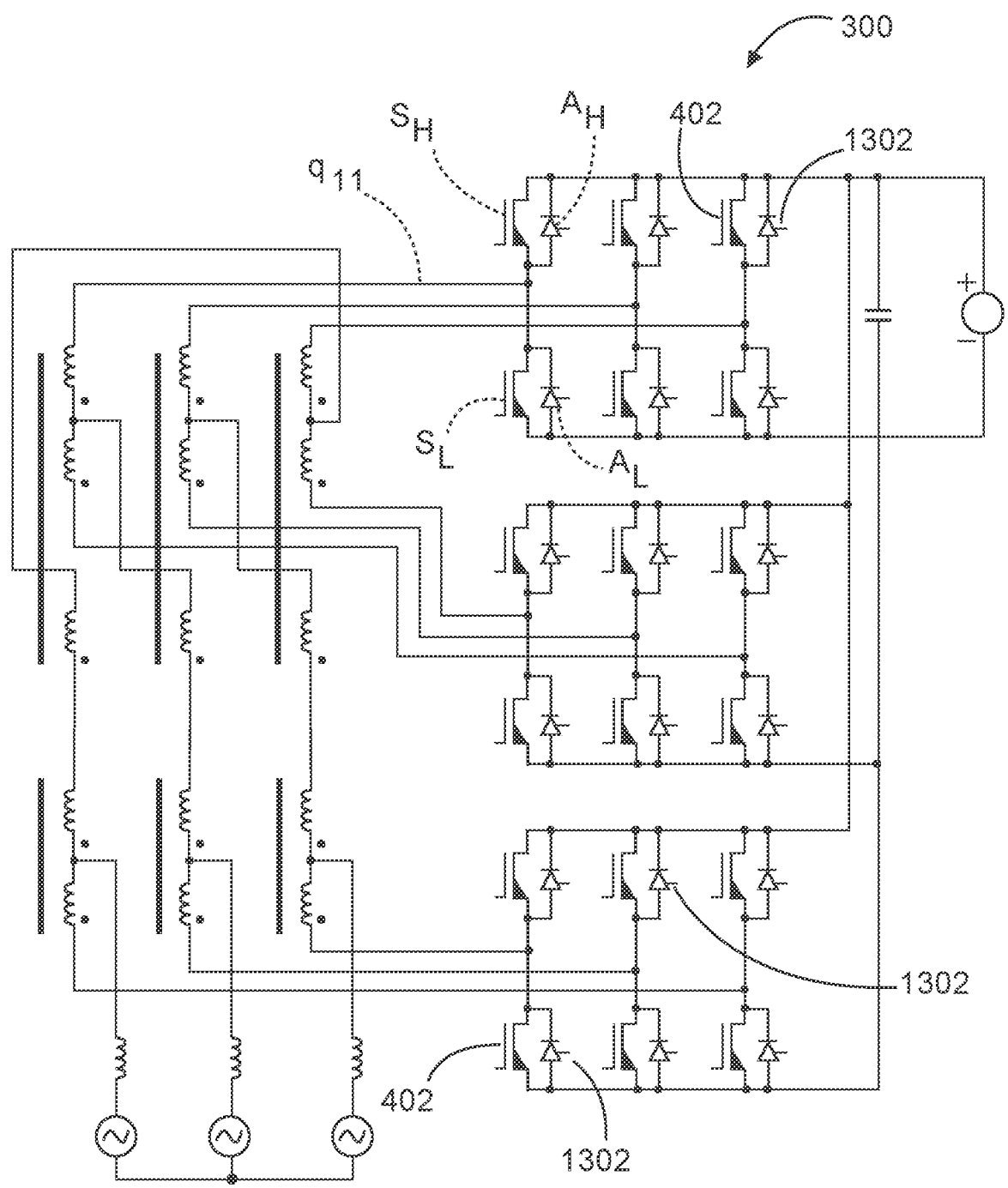
FIG. 13a shows an 18-pulse line-interphase transformer based rectifier/converter employing bi-directional switches for protection in rectifier- and in inverter-mode, with anti-parallel Thyristors, in accordance with the disclosure.
Figure 13B:
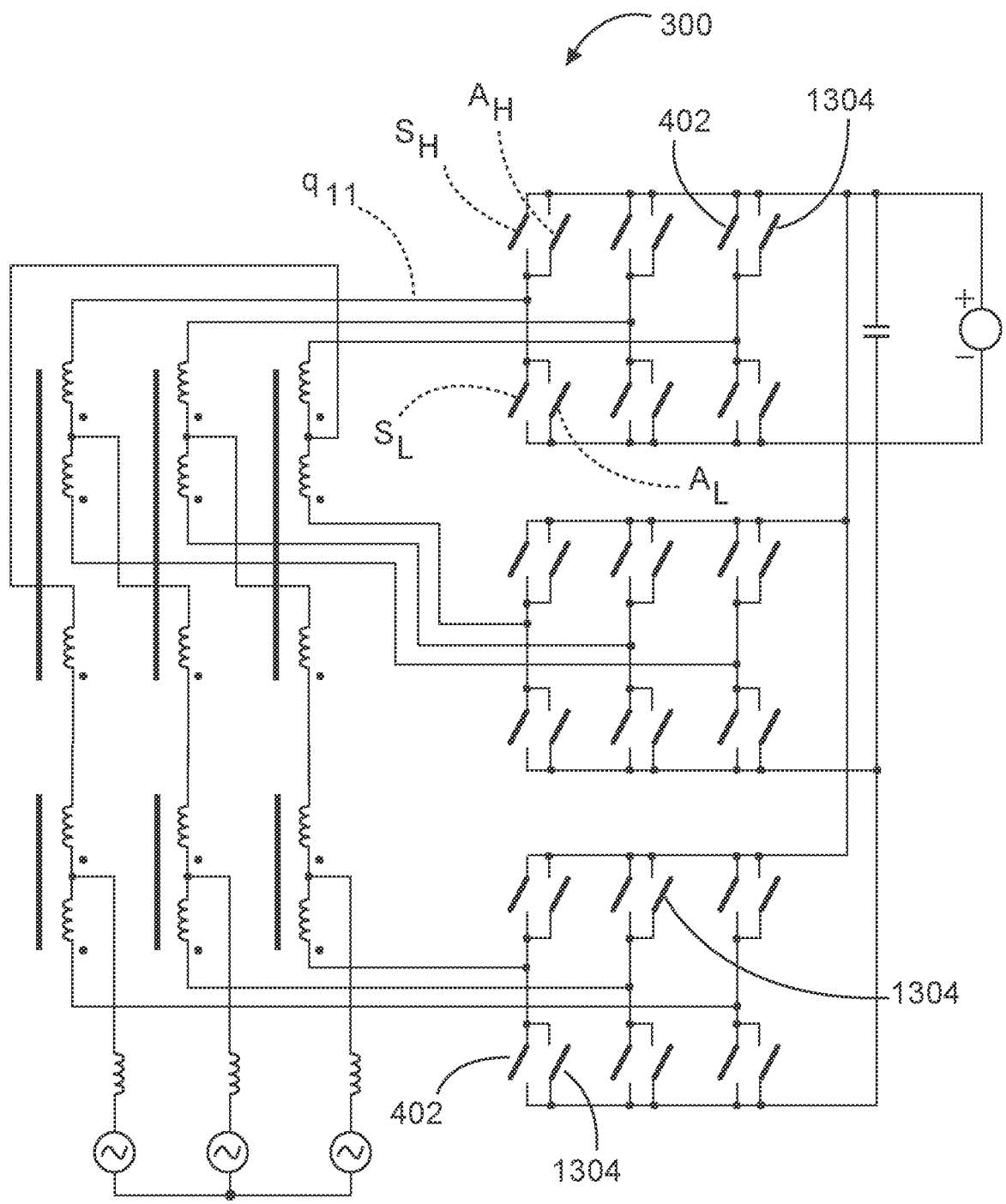
FIG. 13b shows an 18-pulse line-interphase transformer based rectifier/converter employing bi-directional switches for protection in rectifier- and in inverter-mode, with active switches, in accordance with the disclosure.

FIGS. 13a and 13b show an 18-pulse line-interphase transformer based rectifier employing bi-directional switches 402, 1304 as an embodiment of the LIT 300 for protection in rectifier- and in inverter-mode. FIG. 13a depicts a version with anti-parallel thyristors 1302, whereas FIG. 13b shows a version employing active switches 1304 instead of thyristors 1302. Apart from the thyristors 1302 and switches 1304, connected antiparallel to the switches 402, the topology corresponds to that of FIG. 4a.

The active bi-directional switches 402, 1304 consist of a unidirectional switch "S" 402 for current flow mainly from DC to AC plus an anti-parallel thyristor "A" 1302 (FIG. 13a), or, alternatively, consists of an unidirectional switch "S" 402 for current flow mainly from DC to AC, plus an anti-parallel unidirectional switch "A" 1304 for current flow mainly from AC to DC FIG. 13b.

As described above, sinusoidal signals $q_{jk}$ are employed, which are emulated and normalized fundamentals of the AC input voltages of the bridges synchronized to grid-voltages. As also described above, a small phase-angle delay is added to all these signals $q_{jk}$ in order to improve synchronization of the signals with the grid voltages and/or to compensate the small phase shift due to the stray inductances of the inter-phase transformer converter 300 and/or the grid side impedance, where this small phase angle is derived from measured low-frequency harmonics of the grid currents. The control scheme is characterized by employing the above-mentioned sinusoidal signals $q_{jk}$ in the following way: In inverter operation (power flow from DC to AC), each upper thyristor "$A_H$" is triggered when the related emulated signal of its bridge leg crosses −0.5−D with rising slope (assuming that the amplitude of the emulated signal is normalized to one), and when it crosses −x+D at falling slope, with x defined as x=abs(sin(π/6−2*π/pn)) where pn is the pulse number of the converter, and where D is a positive value in the range of a few percent of the normalized signal providing freewheeling during commutation. In case of applying a pulse sequence to the thyristor "$A_H$" the maximum sequence is applied as long as the emulated signal is between −0.5−D and −x+D. In case of employing active switches "$A_H$" like IGBTs instead of thyristors, the on-signal is applied as long as the emulated signal is between −0.5 and −x. For the lower thyristor "$A_L$" of each bridge leg the triggering happens when the related emulated signal crosses +0.5+D at falling slope, and also when it crosses +x−D at rising slope. In case of employing active switches "$A_L$" (like IGBTs) instead of thyristors, the on-signal is applied as long as the emulated signal is between +0.5+D and +x−D.

The control of the active switches 402 in inverter operation is equal to the scheme as proposed above: The upper active switch "$S_H$" of each bridge is in on-state as long as the related emulated signal of its bridge leg is higher than both of the emulated signals of the other two phase legs, and by actively switching this switch into off state when the related emulated signal of its bridge leg becomes lower than one of the two emulated signals of the other two phase legs. Each lower active switch "$S_L$" of each bridge is in on-state as long as the related emulated signal of its bridge leg is lower than both of the emulated signals of the other two phase legs, and by actively switching this switch into off state when the related emulated signal of its bridge leg becomes higher than one of the two emulated signals of the other two phase legs.

In rectifier operation (power flow AC to DC) each upper thyristor "$A_H$" is triggered at zero-crossing at rising slope of the related emulated signal of its bridge leg, and each lower thyristor "$A_L$" is triggered at zero-crossing at falling slope of the related emulated signal of its bridge leg. If a sequence of trigger-pulses is employed, the maximum sequence is applied as long as the emulated signal is positive for the upper thyristor "$A_H$" and/or negative for the lower thyristor "$A_L$". In case of employing active switches (like IGBTs) instead of thyristors, the on-signals are applied as long as the emulated signal is positive for the upper IGBT "$A_H$" and/or as long as the emulated signal is negative for the lower IGBT "$A_L$".

Figure 14A:
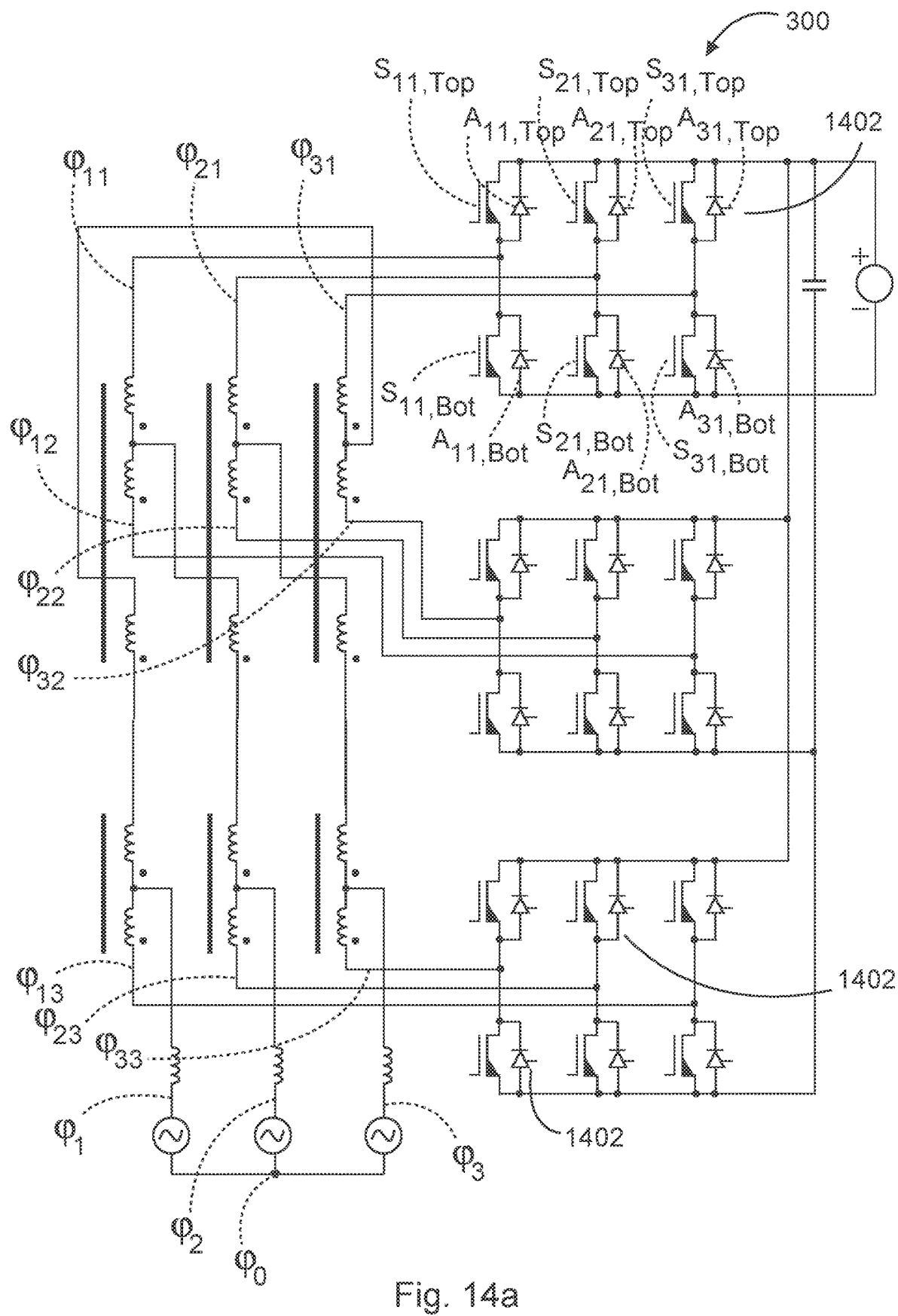
FIG. 14a shows the 18-pulse line-interphase transformer converter of FIG. 13a with designations of potentials and switches in accordance with the disclosure.
Figure 14B:
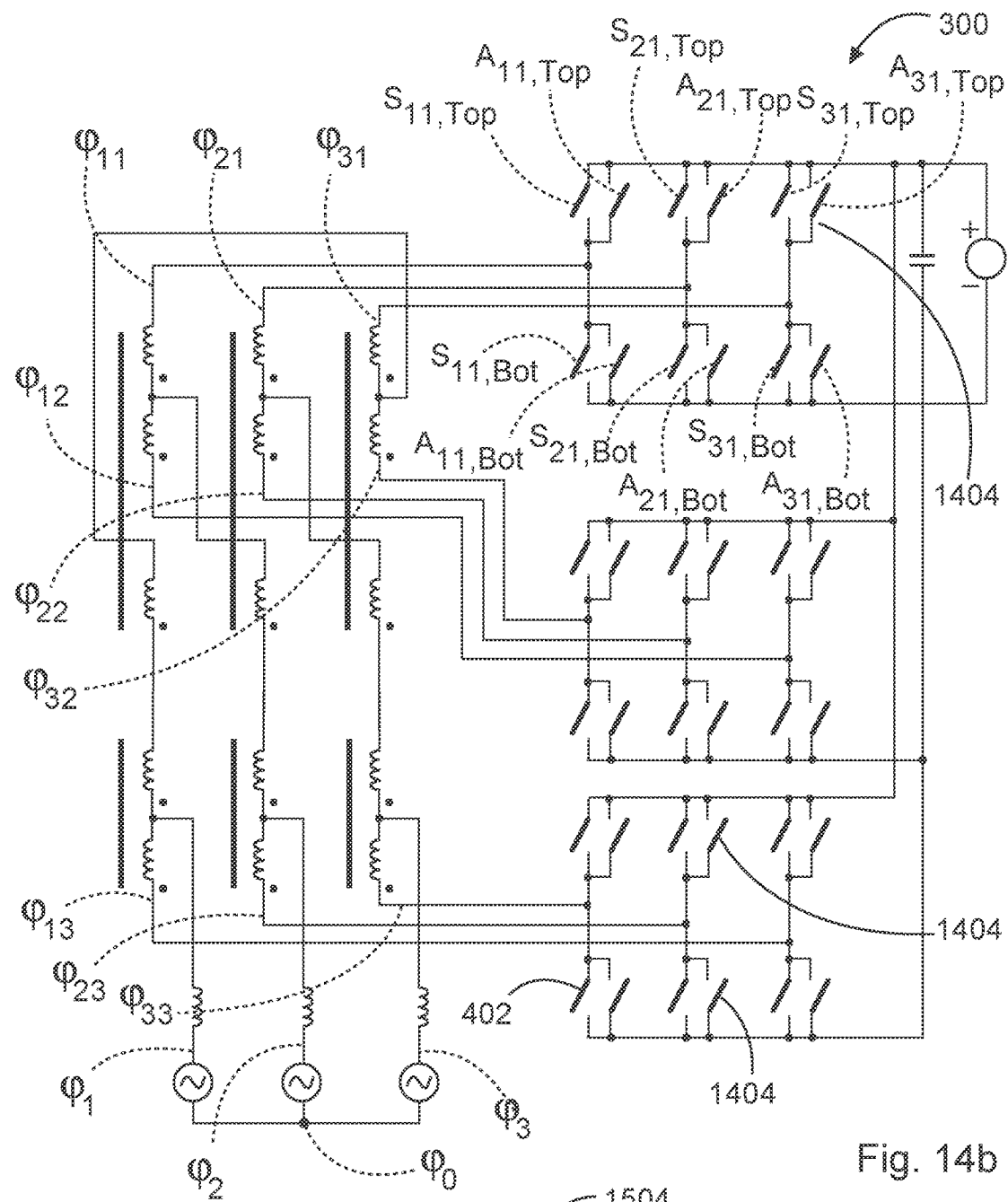
FIG. 14b shows the 18-pulse line-interphase transformer converter of FIG. 13b with designations of potentials and switches in accordance with the disclosure.

FIGS. 14a and 14b show an 18-pulse line-interphase transformer based rectifier employing bi-directional switches as an embodiment of the LIT 300 for protection in rectifier- and in inverter-mode. FIG. 14a shows a version with anti-parallel thyristors 1402; FIG. 14b shows a version employing active switches 1404 instead of thyristors 1402.

Figure 15:
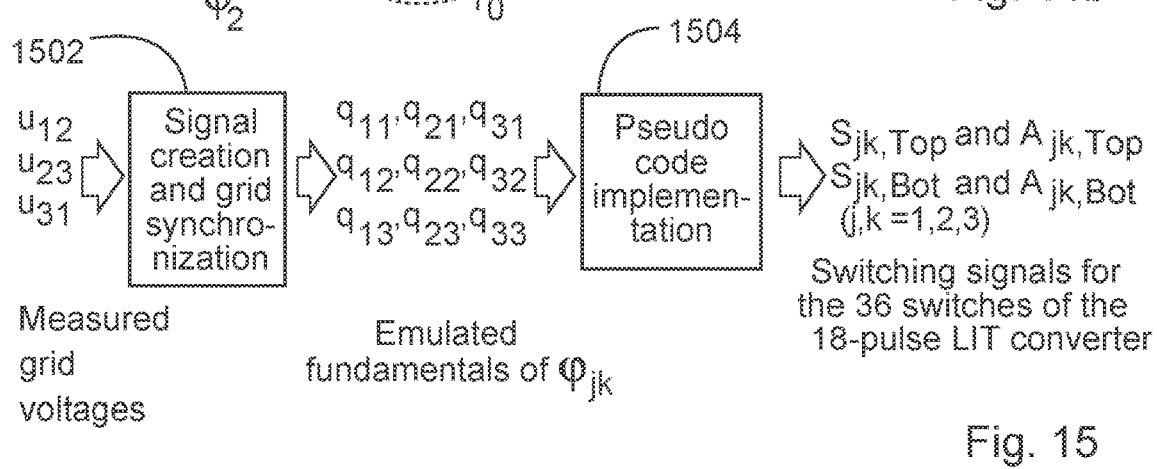
FIG. 15 shows the signal processing and generation of switching signals for the 18-pulse line-interphase transformer converter of FIGS. 13a, 13b, 14a, and 14b.

FIG. 15 shows an implementation of the control scheme. The boxes 1502, 1504 contain signal processing electronics. The grid voltages are measured from the potential differences of the LIT input nodes $\varphi_{in,j}$ in FIGS. 14a and 14b and/or from these input potential to ground (e.g. by artificial star point).

With the definitions of the potentials in FIGS. 14a and 14b and the assumption that the grid voltage fundamentals are defined (especially concerning their phase relations) as $$u_1 = \varphi_1 - \varphi_0 = \hat{u}_N \sin(\omega t)$$

$$u_2 = \varphi_2 - \varphi_0 = \hat{u}_N \sin(\omega t - 2\pi/3)$$

$$u_3 = \varphi_3 - \varphi_0 = \hat{u}_N \sin(\omega t - 2\pi/3)$$

and $$u_{12} = u_2 - u_1$$

$$u_{23} = u_3 - u_2$$

$$u_{31} = u_3 - u_1,$$

the sinusoidal signals $q_{jk}$ are created by the signal processing electronics (block 1502 in FIG. 15), which also continuously measures at least one grid voltage for synchronization, as $$q_{jk} = \sin(\omega t + \theta_{jk})$$

with k=1, 2, 3 and j=1, 2, 3 and with the pre-defined angles as described above, $$\theta_{11} = -7\pi/9, \theta_{21} = +5\pi/9, \theta_{31} = -7\pi/9$$

$$\theta_{12} = -5\pi/9, \theta_{22} = +7\pi/9, \theta_{32} = +7\pi/9$$

$$\theta_{13} = 0, \theta_{23} = -2\pi/3, \theta_{33} = +2\pi/3$$

Then, we get in very good approximation $$q_{1k} = \varphi_{1k(1)}, q_{2k} = \varphi_{2k(1)}, q_{3k} = \varphi_{3k(1)}$$

For the inverter operation the current is mainly flowing in switch "S" 402 but also partly flowing in the switch "A" 1402, 1404. The related trigger level x for switching "A" is defined dependent on the converter pulse number pn (which is 18 in case of the 18-pulse LIT converter) as $$x = abs\left(\sin\left(\frac{\pi}{6} - \frac{2\pi}{p_n}\right)\right)$$

With this we can define the switching pattern for inverter operation (power flow DC to AC) as if $q_{1k} > q_{2k}$ and $q_{1k} > q_{3k}$ then $S_{1k,Top}$=on else $S_{1k,Top}$=off
if $q_{2k} > q_{3k}$ and $q_{2k} > q_{1k}$ then $S_{2k,Top}$=on else $S_{2k,Top}$=off
if $q_{3k} > q_{1k}$ and $q_{3k} > q_{2k}$ then $S_{3k,Top}$=on else $S_{3k,Top}$=off
if $q_{1k} < q_{2k}$ and $q_{1k} < q_{3k}$ then $S_{1k,Bot}$=on else $S_{1k,Bot}$=off
if $q_{2k} < q_{3k}$ and $q_{2k} < q_{1k}$ then $S_{2k,Bot}$=on else $S_{2k,Bot}$=off
if $q_{3k} < q_{1k}$ and $q_{3k} < q_{2k}$ then $S_{3k,Bot}$=on else $S_{3k,Bot}$=off
if $-0.5 - D < q_{1k}$ and $q_{1k} < -x+D$ then $A_{1k,Top}$=on else $A_{1k,Top}$=off
if $-0.5 - D < q_{2k}$ and $q_{2k} < -x+D$ then $A_{2k,Top}$=on else $A_{2k,Top}$=off
if $-0.5 - D < q_{2k}$ and $q_{2k} < -x+D$ then $A_{3k,Top}$=on else $A_{3k,Top}$=off
if $+x - D < q_{1k}$ and $q_{1k} < +0.5+D$ then $A_{1k,Bot}$=on else $A_{1k,Bot}$=off
if $+x - D < q_{2k}$ and $q_{2k} < +0.5+D$ then $A_{2k,Bot}$=on else $A_{2k,Bot}$=off
if $+x - D < q_{3k}$ and $q_{3k} < +0.5+D$ then $A_{3k,Bot}$=on else $A_{3k,Bot}$=off with D being a positive value in the range of a few percent of the normalized signals $q_{jk}$, e.g. D=0.02. Adding D as described in the code above is absolutely essential to prevent huge switching overvoltage during commutation which reduces lifetime and/or destroys the semiconductors.

For rectifier operation (power flow AC to DC) there is
$S_{1k,Top}$=Off $S_{2k,Top}$=Off $S_{3k,Top}$=off
$S_{1k,Bot}$=off $S_{2k,Bot}$=off $S_{3k,Bot}$=off
if $q_{1k} > 0$ then $A_{1k,Top}$=on else $A_{1k,Top}$=off
if $q_{2k} > 0$ then $A_{1k,Top}$=on else $A_{2k,Top}$=off
if $q_{3k} > 0$ then $A_{1k,Top}$=on else $A_{3k,Top}$=off
if $q_{1k} > 0$ then $A_{1k,Bot}$=on else $A_{1k,Bot}$=off
if $q_{2k} > 0$ then $A_{1k,Bot}$=on else $A_{2k,Bot}$=off
if $q_{1k} > 0$ then $A_{1k,Bot}$=on else $A_{3k,Bot}$=off
for
k=1,2,3

Figure 16:
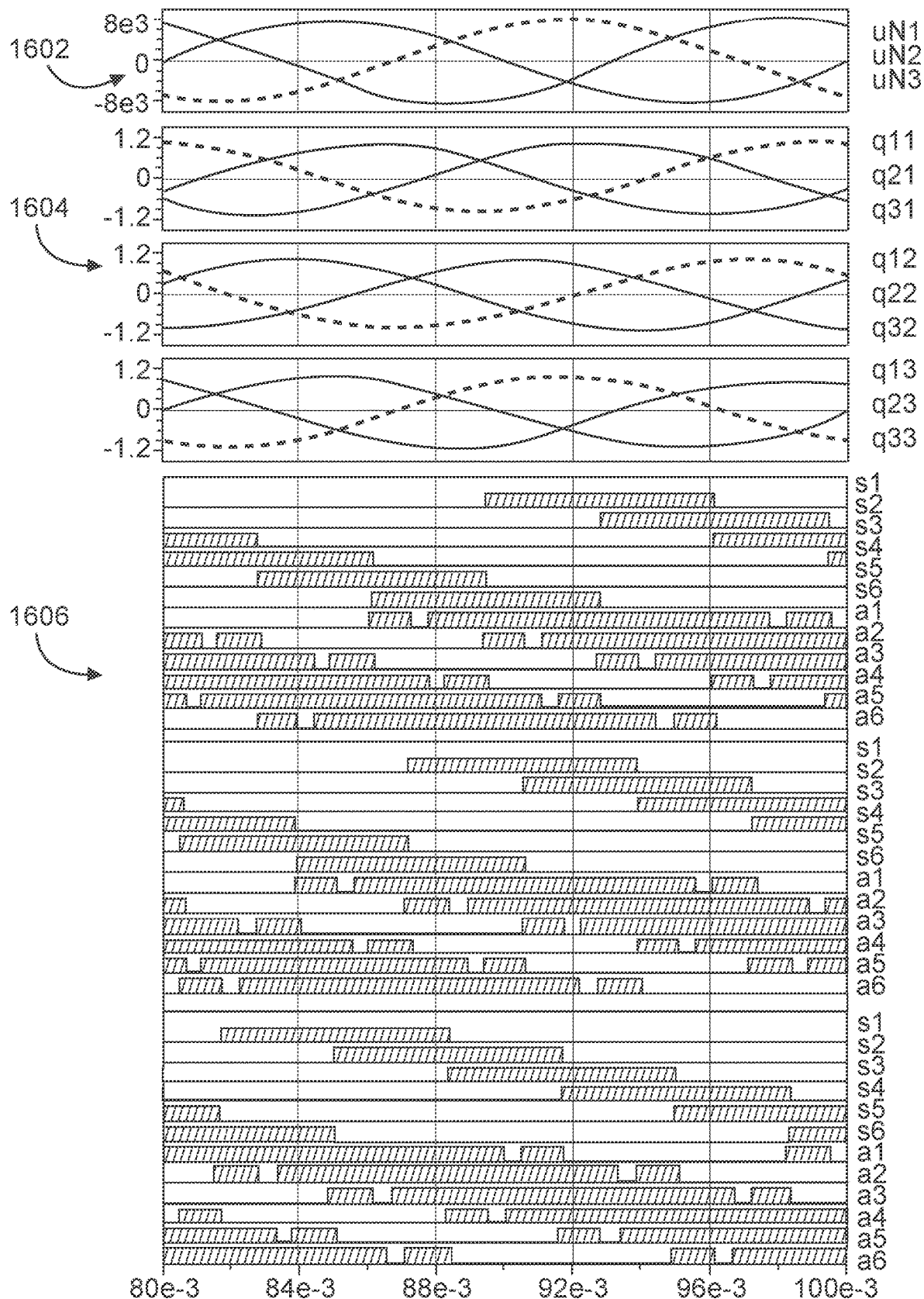
FIG. 16 shows the grid voltages $u_{Ni}$, signals $q_{jk}$ and switching signals for the 18-pulse line-interphase transformer converter of FIGS. 13-15.

One can detect the power flow direction and select the required switching scheme, or alternatively, one can combine the above schemes for inverter- and rectifier operation via logical OR-operations of the switching signals and apply the combined scheme for both modes, see FIG. 16.

FIG. 16 shows combined switching signals of an 18-pulse LIT converter with antiparallel switches for both rectifier- and inverter-mode: Grid voltages (phase to ground) $u_{Ni}$ 1602, signals $q_{jk}$ 1604, and switching signals 1606. Note: For employing thyristors, the trigger pulses are created whenever an "A"-signal changes from 0 to 1.

The signals 1604 derived from the pseudo code above and shown in FIG. 16 are required if the switches "A" are realized as active switches like IGBTs (FIG. 14b).

If one employs thyristors 1402 as switches "A", it is sufficient and, sometimes, essential, to provide a trigger pulse whenever the switching signal of a switch "A"1402 changes from "off" to "on". This ensures minimum gate power requirements. For improved reliability one might apply an additional sequence of thyristor gate trigger pulses within the periods where the switching signals as defined in the pseudo code above are "on".

Figure 17:
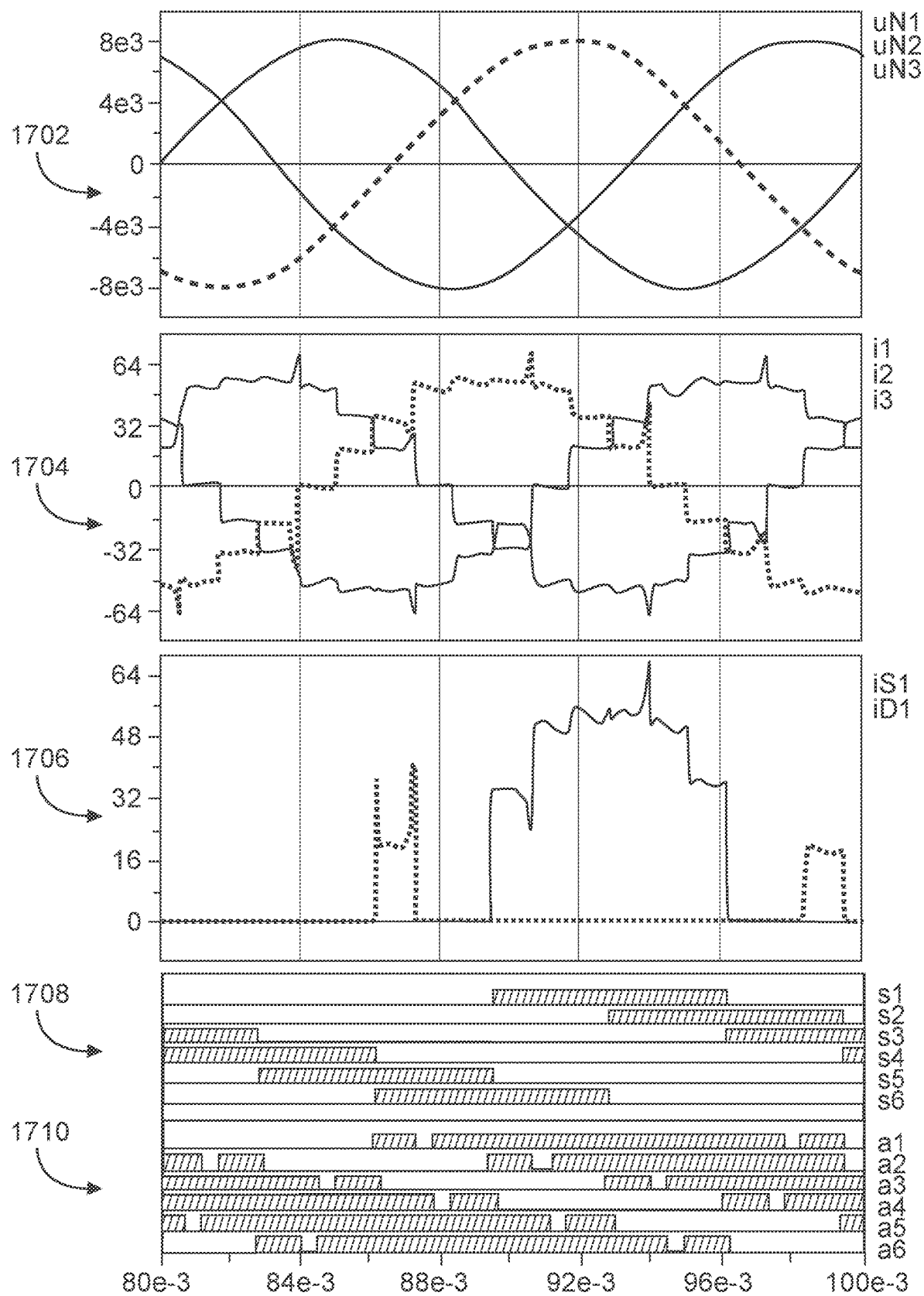
FIG. 17 shows the grid voltages (phase to ground) $u_{Ni}$, converter input currents $i_{Ni}$ in inverter operation, currents through switch "S" and anti-parallel switch "A" for the 18-pulse line-interphase transformer converter of FIGS. 13-15.

FIG. 17 shows in diagram 1702 grid voltages (phase to ground) $U_{Ni}$, in diagram 1704 converter input currents $i_{Ni}$ in inverter operation, in diagram 1706 currents through switch "S" 402 and anti-parallel switch "A" 1404 of an 18-pulse LIT converter 300 with antiparallel switches and combined switching signals, as shown, for example, in FIG. 14b. Diagram 1706 shows that in inverter operation the switch "S" 402 takes the main part of the current, but also current flow through its anti-parallel switch "A" 1404 is required to guarantee proper operation without lower harmonics, which must is guaranteed by the presented control scheme. Note: For employing thyristors 1402 as shown in FIG. 14a, the trigger pulses are created whenever an "A"-signal changes from 0 to 1.

Application in 12-pulse and 24-pulse systems: Generally, for 12- and 24-pulse systems, the switching decisions in inverter operation are defined as if $q_{jk} > q_{jk}$ and $q_{jk} > q_{jk}$ then $S_{jk,Top}$=on else $S_{jk,Top}$=off
if $q_{jk} > q_{jk}$ and $q_{jk} > q_{jk}$ then $S_{jk,Bot}$=on else $S_{jk,Bot}$=off if $-0.5-D<q_{jk}$ and $q_{jk}<-x+D$ then $A_{jk,Top}=$on else $A_{jk,Top}=$off if $+x-D<q_{jk}$ and $q_{jk}<+0.5+D$ then $A_{jk,Bot}=$on else $A_{jk,Bot}=$off with $q_{jk}=\varphi_{jk(1)}$ with $0<D<<\max(q_{jk})$ for j=1, 2, 3 and for k=1, 2 for the 12-pulse system and/or for k=1, 2, 3, 4 for the 24-pulse system For the 12- and 24-pulse system, with the definitions of the potentials in FIG. 18a, 18b, 19a FIG. 19b, and with the assumption that the grid voltage fundamentals are defined (especially concerning their phase relations) as $$u_1=\varphi_1-\varphi_0=\hat{u}_N\sin(\omega t)$$

$$u_2=\varphi_2-\varphi_0=\hat{u}_N\sin(\omega t-2\pi/3)$$

$$u_3=\varphi_3-\varphi_0=\hat{u}_N\sin(\omega t-2\pi/3)$$

and $$u_{12}=u_2-u_1$$

$$u_{23}=u_3-u_2$$

$$u_{31}=u_3-u_1,$$

the sinusoidal signals $q_{jk}$ are created by the signal processing electronics (block 1502 in FIG. 15), which also continuously measures at least one grid voltage for synchronization, as $$q_{jk}=\sin(\omega t+\theta_{jk})$$

For the 24-pulse system the required phase angles are as also described above $$\theta_{11}=-3\pi/4, \theta_{21}=+7\pi/12, \theta_{31}=-\pi/12,$$

$$\theta_{12}=-7\pi/12, \theta_{22}=+3\pi/4, \theta_{32}=+\pi/12$$

For the 12-pulse system the required phase angles are as also described above $$\theta_{11}=+97.5\pi/180, \theta_{21}=-22.5\pi/180, \theta_{31}=-142.5\pi/180,$$

$$\theta_{12}=+127.5\pi/180, \theta_{22}=+7.5\pi/180, \theta_{32}=-112.5\pi/180,$$

$$\theta_{13}=+112.5\pi/180, \theta_{23}=-7.5\pi/180, \theta_{33}=-127.5\pi/180,$$

$$\theta_{14}=+142.5\pi/180, \theta_{24}=+22.5\pi/180, \theta_{34}=-97.5\pi/180,$$

Figure 18A:
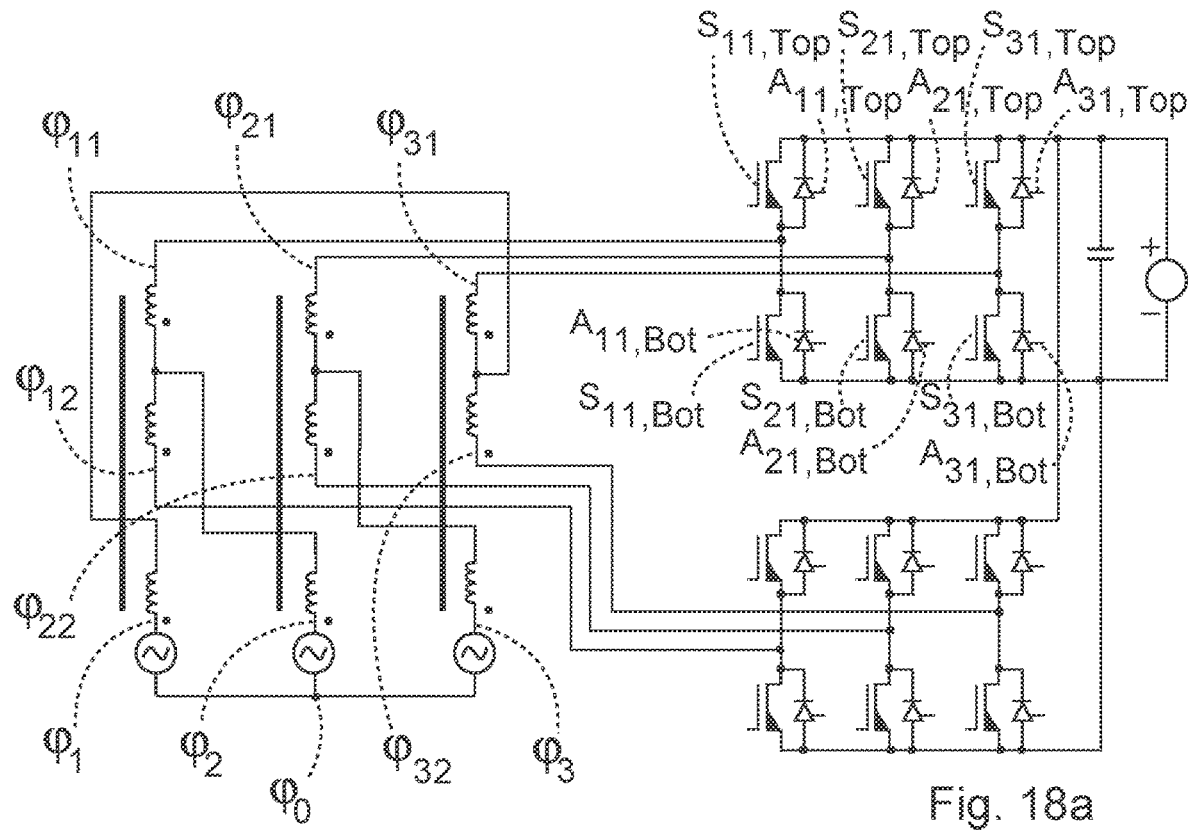
FIG. 18a shows a 12-pulse line-interphase transformer based rectifier employing bi-directional switches for protection in rectifier- and in inverter-mode, with anti-parallel Thyristors, in accordance with the disclosure.
Figure 18B:
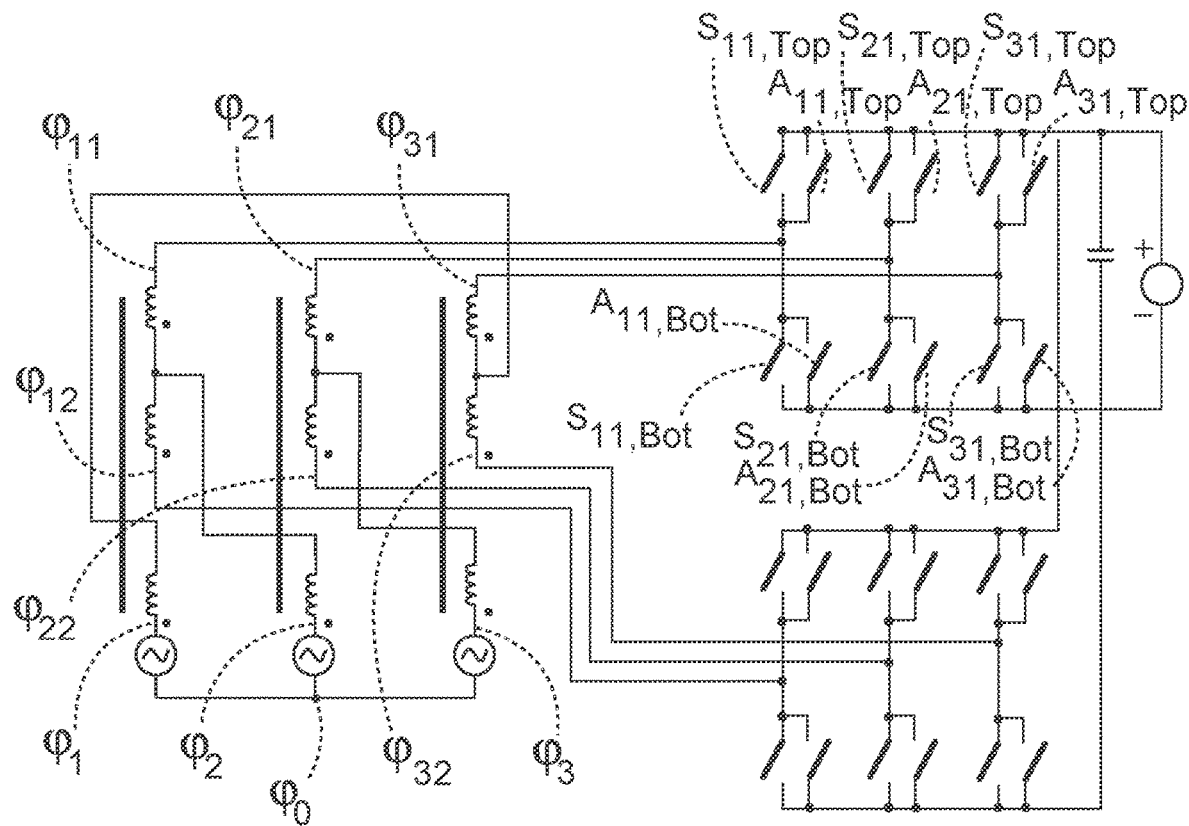
FIG. 18b shows a 12-pulse line-interphase transformer based rectifier employing bi-directional switches for protection in rectifier- and in inverter-mode, with active switches, in accordance with the disclosure.

FIGS. 18a and 18b show a 12-pulse line-interphase transformer based rectifier employing bi-directional switches for protection in rectifier- and in inverter-mode. FIG. 18a shows a version with anti-parallel thyristors. FIG. 18b shows a version employing active switches instead of thyristors.

Figure 19A:
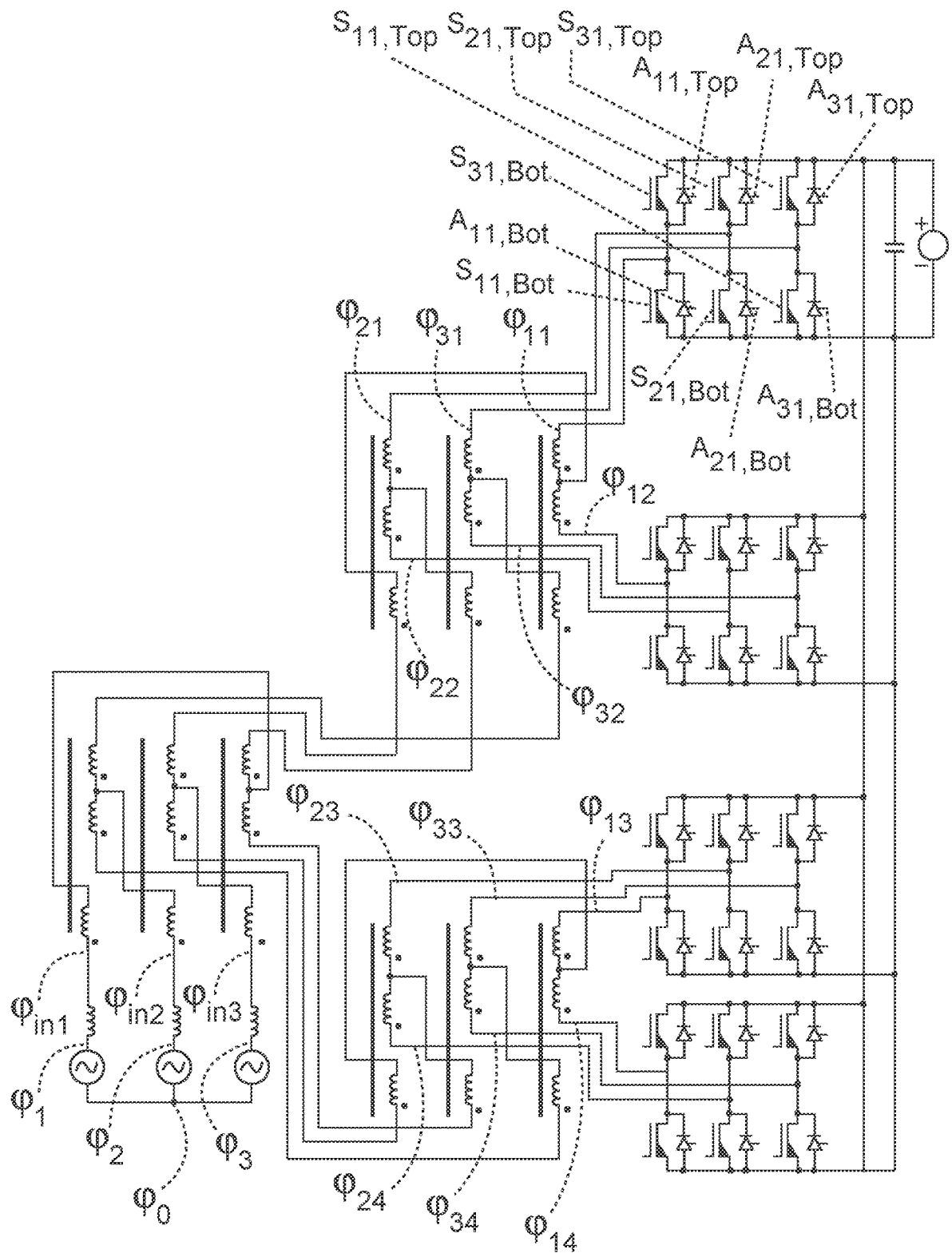
FIG. 19a shows a 24-pulse line-interphase transformer based rectifier employing bi-directional switches for protection in rectifier- and in inverter-mode, with anti-parallel Thyristors, in accordance with the disclosure.
Figure 19B:
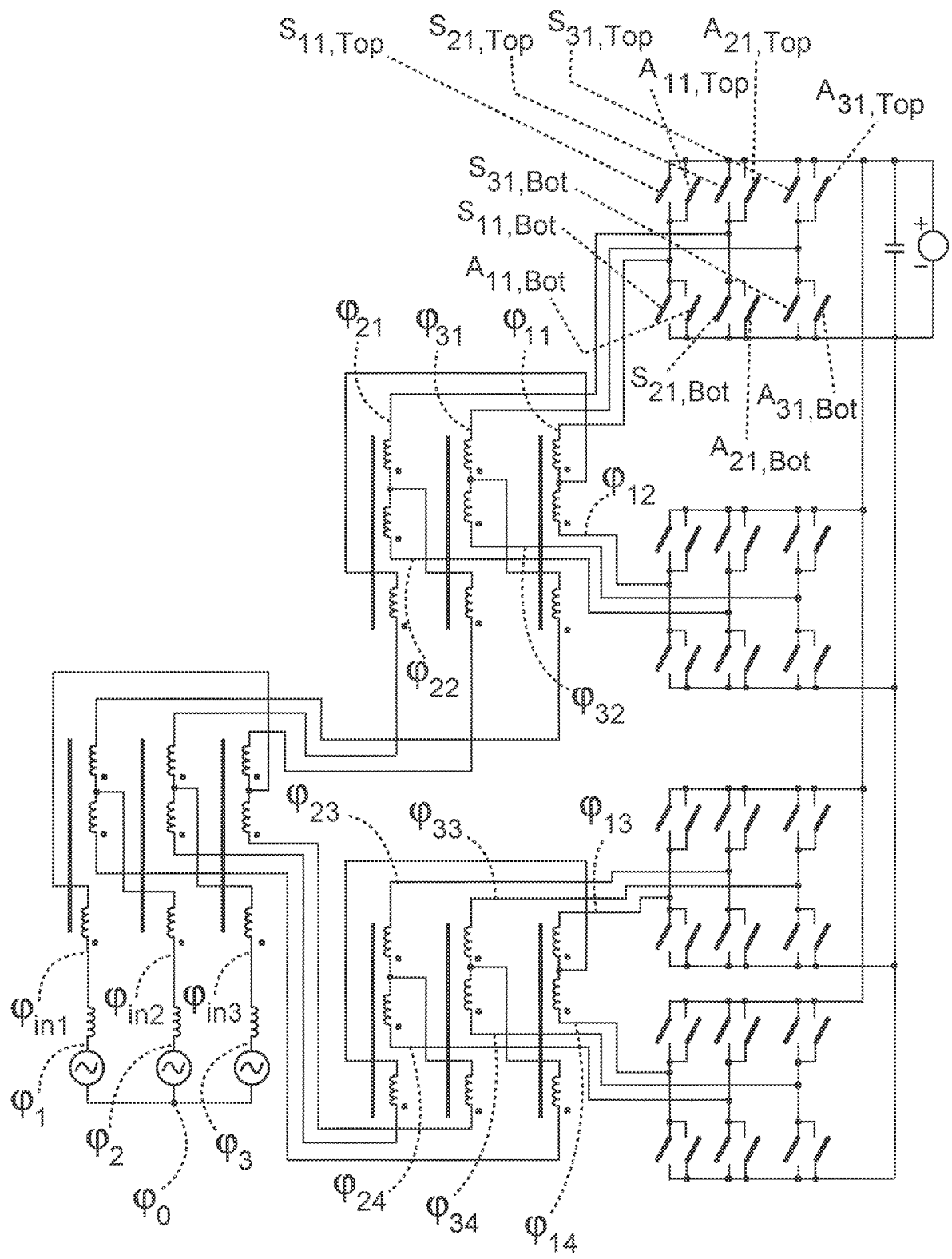
FIG. 19b shows a 24-pulse line-interphase transformer based rectifier employing bi-directional switches for protection in rectifier- and in inverter-mode, with active switches, in accordance with the disclosure.

FIGS. 19a and 19b show a 24-pulse line-interphase transformer based rectifier employing bi-directional switches for protection in rectifier- and in inverter-mode. FIG. 19a shows a version with anti-parallel thyristors. FIG. 19b shows a version employing active switches instead of thyristors.

The control scheme for the topologies with antiparallel switches or thyristors allows fast short interruption of a bi-directional multi-pulse LIT AC/DC converter for both power flow directions (e.g. short circuit at the AC side and/or short circuit at the DC side), and allows blocking twice the nominal grid voltage while employing semiconductors in the bridges which are rated only for nominal blocking voltage capability. The control scheme further enables the use of thyristors replacing the rectifier diodes.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

REFERENCE NUMERALS

100 Modular Multi-Level Converters (MMC)
102 MMC Cell
104 MMC Cell capacitor
110 Three-level converter
120 18-pulse Line-Interphase Transformer (LIT) based rectifier
300 Line-Interphase Transformer (LIT)
301 Converter
302 Magnetic part of the converter
304 Electric part of the converter, three-phase voltage system
306 Control unit
310 Processing unit/signal processor
312 Controller
320 External AC interface
322 External DC interface
324 Internal interface
402 Switches "S"
404 Antiparallel diode
406 Bridge
408 Upper bridge arrangement/phase shifted voltage system
410 Middle bridge arrangement/phase shifted voltage system
412 Lower bridge arrangement/phase shifted voltage system
414 AC branch/AC phase
416 Common capacitor/DC link
418 AC grid
420 Inductor
422 Center tap at coil 424
424 First coils
426 Inductor
428 Center tap at coil 430
430 Second coils
506 Center tap at coil 508
508 Second coils
602 Center taps in magnetic part of the 24-pulse LIT
802 Processing block "Signal creation and grid synchronization"
804 Processing block "Pseudo code implementation"
902 Line (point of time) indicating switching event
912 Diagram of emulated voltages $q_{11}$, $q_{21}$, $q_{31}$
922 Switching diagram corresponding to diagram 912
1002 Diagram of grid voltages (phase to ground)
1004 Diagram of converter input currents $i_{Ni}$ in inverter operation

1006 Diagram of signals $q_{y1}$ emulating fundamental AC input voltages of one bridge vs. its AC input voltage of one leg

1008 Diagram of switching signals for an 18-pulse LIT converter.

1402 Antiparallel thyristors

1404 Anti-parallel switches "A"

1502 Processing block "Signal creation and grid synchronization"

1504 Processing block "Pseudo code implementation"

1602 Diagram with grid voltages (phase to ground) $u_{Ni}$

1604 Diagram with signals $q_{jk}$

1606 Diagram with switching signals

1702 Diagram with grid voltages (phase to ground) $u_{Ni}$

1704 Diagram with signals $q_{jk}$

1708 Diagram with switching signals for switches S

1708 Diagram with switching signals for switches A

The present disclosure provides a converter topology, which combines the advantages of the line-interphase-transformer based multi-pulse rectifier such as negligible switching losses, high efficiency, simple, extremely compact, low cost, with bi-directionality and the ability to provide high current of approximately sinusoidal shape at low switching frequency. This new converter topology provides a low-cost alternative of highest power density to state-of-the-art systems in all applications where bi-directional and/or DC-to-AC energy flow is required.

The present disclosure further provides a general control scheme of the active switches in inverter operation for converter topologies where a multi-pulse line interphase transformer is connected to bridges, which employ switches, which can be actively switched off, and which are antiparallel to the bridge's rectifier diodes, and where all bridges are parallel-connected to a common DC link.

Further, a control scheme for the converter topology of the first aspect is provided.

Furthermore, a protection circuit with protective devices is provided to protect the devices of the converter topology, to ensure that short circuits on AC-side and/or on DC-side do not harm the converter topology, and to ensure that the requirements of the converter with respect to the AC grid are fulfilled also in a short circuit case.

According to a first aspect, a multi-pulse line-interphase transformer converter comprising a magnetic part and an electric part is provided. The magnetic part comprises magnetic components configured to be connected to a three-phase AC grid, and the electric part comprises a multi-phase voltage system configured to be connected to a common DC capacitor. The magnetic part is configured to split each AC grid phase n times into two phases, resulting in a plurality of intermediate phases, e.g. (n+1)×3 intermediate phases, each intermediate phase corresponding to a pulse line of the multi-pulse line-interphase transformer converter. The intermediate phases, i.e. pulse lines are connected to the multi-phase voltage system. The multi-phase voltage system comprises bridges with actively controlled switches, and the bridges are connected in parallel to the common DC capacitor.

The connection to the AC grid may be considered as a first external interface, or AC, interface, and a terminal at the common DC capacitor may be considered as a second external interface, or a DC interface. The connection of the split phases to the multi-phase voltage system may be considered as an internal interface. Magnetic components are transformers or inductances that may have an iron core. The splitting of a grid phase into two phases may be achieved by a center tap of a coil where the center tap is the AC phase and the ends of the coil are the represent the split phases. The splitting may be cascaded such that one or both of the split phases are split again. If the splitting is done equally for each AC phase branch, n times the three AC phase branches are obtained as number of different phases, wherein n is the number of splits in an AC phase branch. The end sides of the last of the cascaded coils are connected to the voltage system such that a lower end of a first coil in the cascade is connected to the center of a leg of a first three-phase bridge arrangement. These connections are herein also designated as "intermediate pulse lines", or "intermediate phases" due to the correspondence of these phases to these lines. A lower end of a second coil in the cascade is connected to the center of a leg of a second three-phase bridge arrangement, etc., and finally an upper end of the last coil in the cascade is connected to the center of a leg of the n+1$^{st}$ three-phase bridge arrangement. In each AC phase branch, a further coil may be inserted between cascaded coils that may be magnetically connected to a neighboring AC phase branch.

According to an embodiment, the electric part comprises devices connected parallel to the switches, conducting current antiparallel to the switches. These devices arranged in parallel may be generally capable to conduct the current only in the antiparallel direction, or they may be capable to conduct the current in both directions. At least in the latter case, these devices may be switchable. The parallel devices allow for a bi-directional operation of the converter and may provide protection functionality as described further below.

According to an embodiment, the switches are thyristors or transistors, such as IGBTs or IGCTs, or MOSFETs such as SiC-MOSFETs with body diodes providing rectifier operation. Thyristors or transistors may have different control requirements.

According to an embodiment, the line-interphase transformer converter comprises a control unit with a signal processing unit configured to emulate the magnetic part and to provide emulated intermediate phase signals to a controller for controlling the switches, wherein the emulated intermediate phase signals are sinusoidal signals having a pre-calculated phase angle. The input of a controller are usually voltages or directly measured signals. The signals, however, may be heavily noisy. By configuring the signal processing unit to emulate the AC input voltages the controller can use smooth signals instead of noisy measured signals. The signal processing unit may use itself measured signals, however, it is able to filter the measured signal and to emulated the magnetic components such as the inductivities, and to generate any intermediate phase signals. In particular, it may calculate the intermediate phase signals on the internal interface.

According to an embodiment, the emulation is based on measurements of voltages at the three-phase AC grid connection. Starting from these measurements, the signal processor can filter and emulate any signal inside the magnetic part.

According to an embodiment, the control unit comprises further a controller configured to control the switches based on a comparison of the emulated intermediate phase voltages of the intermediate phase signal and pre-defined voltage ranges.

According to an embodiment, the bridges are arranged in bridge arrangements, each bridge arrangement comprising three bridges. Each bridge is connected to an intermediate phase of corresponding splits of the three AC grid phases, wherein the intermediate phases are connected at a center point between two switches, the center point being a bridge leg. Further, according to this embodiment, the controller is configured to generate control signals based on the comparison such that the upper active switch of each bridge is in on-state as long as the related emulated signal of its bridge leg is higher than both of the emulated signals of the other two phase legs. This switch is actively switched into off state when the related emulated signal of its bridge leg becomes lower than one of the two emulated signals of the other two phase legs. Each lower active switch of each bridge is in on-state as long as the related emulated signal of its bridge leg is lower than both of the emulated signals of the other two phase legs. This switch is actively switched into off-state when the related emulated signal of its bridge leg becomes higher than one of the two emulated signals of the other two phase legs.

According to an embodiment, the controller or the signal processing unit are configured to calculate an additional angle and to add the additional angle to one of the pre-calculated phase angles of the emulated signals.

According to an embodiment, the controller or the signal processing unit are configured to calculate an angle contributing to the additional angle based on measuring input currents on AC grid-side and using their low order harmonic amplitudes, for example the $3^{rd}$, $5^{th}$, $7^{th}$ harmonic.

According to an embodiment, the controller or the signal processing unit are configured to calculate an angle contributing to the additional angle that compensates for the line-interphase transformer's stray inductances and/or other parasitics and/or to control reactive power.

According to an embodiment, the additional angle is a common angle calculated for and added to all emulated signals; or the additional angle is an angle calculated for and added to each of the emulated signals individually.

Furthermore, the signal processing unit or the controller may be configured to measure the AC input voltages of the legs of each bridge and to derive the fundamentals by filtering e.g., using a Fourier-analysis for deriving a control signal for fine-tuning the emulated signals and/or for replacing them.

The control may be kept continuously "on" in rectifier operation for preventing DC link over-voltages in case of sudden loss of the load.

According to an embodiment, the line-interphase transformer converter comprises thyristors or controllable switches connected anti-parallel to the switches. The anti-parallel thyristors or controllable anti-parallel switches can be used for protecting the voltage system.

According to an embodiment, the multi-pulse line-interphase transformer converter may be configured such that in inverter operation, (power flow from DC to AC), each upper thyristor of a bridge is triggered when the related emulated signal of its bridge leg crosses −0.5−D with rising slope (assuming that the amplitude of the emulated signal is normalized to one), and when it crosses −x+D at falling slope, wherein x is defined as $x=abs(sin(\pi/6-2*\pi/pn))$, where pn is the pulse number of the converter, and where D is a positive value in the range of a few percent of the normalized signal providing freewheeling during commutation. In rectifier operation (power flow AC to DC), each upper thyristor is triggered at zero-crossing at rising slope of the related emulated signal of its bridge leg, and each lower thyristor is triggered at zero-crossing at falling slope of the related emulated signal of its bridge leg. If a sequence of trigger-pulses is employed, the maximum sequence is applied as long as the emulated signal is positive for the upper thyristor and/or negative for the lower thyristor. In case of employing active switches (like IGBTs) instead of thyristors, the on-signals are applied as long as the emulated signal is positive for the upper IGBT "$A_H$" and/or as long as the emulated signal is negative for the lower IGBT "$A_L$".

Adding and/or subtracting a small positive value to the emulated signals might prevent huge short-term overvoltage during switching.

In rectifier operation with power flow from AC to DC and a short on the DC side, if there were diodes only, it would not possible to switch off and limit the short circuit currents. Furthermore, the diodes must be able to block the maximum line-to-line grid voltage. If the converter has to be designed according to specifications where significant grid-side overvoltage (e.g. factor two compared to nominal) could occur, the diodes would have to be accordingly over-dimensioned related to their blocking voltage ability, resulting in higher cost, higher losses and reduced efficiency.

The embodiment proposes a circuit topology and control which solves these two problems by providing the ability of fast switching-off in rectifier operation in case of a DC short, and allowing the usage of semiconductor devices rated at nominal blocking voltage even in case of AC overvoltage as high as twice the nominal grid voltage.

According to an embodiment the line-interphase transformer converter is a 6, 12, 18, 24, 48 pulse line-interphase transformer.

The control unit, i.e., the signal processing and the controller may comprise processing logic. The processing logic may be implemented as hardware and/or software. The software may be a computer program element stored in a memory and run on a processor realized as an embedded system or in a computer architecture. The computer program element may be part of a computer program, but it can also be an entire program by itself. For example, the computer program element may be used to update an already existing computer program to get to the present invention.

The controller may comprise circuits without programmable logics or may be or comprise a micro controller, a field programmable gate array (FPGA), an ASIC, a Complex Programmable Logic Devices (CPLD), or any other programmable logic devices known to person skilled in the art.

The computer readable medium may be seen as a storage medium, such as for example, a USB stick, a CD, a DVD, a data storage device, a hard disk, or any other medium on which a program element as described above can be stored.

These and other features, aspects and advantages of the present invention will become better understood with reference to the accompanying FIG. and the following description.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A multi-pulse line-interphase transformer converter comprising:
   a magnetic part including magnetic components configured to be connected to a three-phase AC grid; and
   an electric part including a multi-phase voltage system configured to be connected to a common DC capacitor;
   wherein the magnetic part is configured to split each AC grid phase n times into two phases, resulting in a plurality of intermediate phases at an internal interface, each intermediate phase corresponding to a pulse line of the multi-pulse line-interphase transformer converter;
   wherein the intermediate phases are connected to the multi-phase voltage system;
   wherein the multi-phase voltage system comprises bridges with actively controlled switches;
   wherein the bridges are connected in parallel to the common DC capacitor; and
   wherein the multi-pulse line-interphase transformer converter further comprises a control unit having a signal processing unit configured to emulate the electric part and to provide emulated intermediate phase signals to a controller for controlling the actively controlled switches, and wherein the emulated intermediate phase signals are sinusoidal signals having a pre-calculated phase angle.

2. The multi-pulse line-interphase transformer converter according to claim 1, wherein the electric part further includes devices that are connected parallel to the actively controlled switches such that the devices conduct current antiparallel to the actively controlled switches.

3. The multi-pulse line-interphase transformer converter according to claim 1, wherein the actively controlled switches are thyristors or transistors.

4. The multi-pulse line-interphase transformer converter according to claim 1, wherein the emulation is based on measurements of voltages at the three-phase AC grid connection.

5. The multi-pulse line-interphase transformer converter according to claim 1, wherein the control unit further comprises a controller configured to control the actively controlled switches based on a comparison of the emulated AC input voltages and pre-defined voltage ranges.

6. The multi-pulse line-interphase transformer converter according to claim 5, wherein the bridges are arranged in a plurality of bridge arrangements, each of the plurality of bridge arrangements comprising three bridges, wherein each bridge is connected to an intermediate phase of corresponding splits of the three AC grid phases, wherein the intermediate phases are connected at a center point between two actively controlled switches, the center point being a bridge leg, and wherein the controller is configured to generate control signals based on the comparison such that:
   an upper active switch $S_{Top}$ of each bridge is in on-state while the related emulated signal of its bridge leg is higher than both of the emulated signals of the other two phase legs, and this upper active switch $S_{Top}$ is actively switched into off state when the related emulated signal of its bridge leg becomes lower than one of the two emulated signals of the other two phase legs;
   each lower active switch $S_{Bot}$ of each bridge is in on-state while the related emulated signal of its bridge leg is lower than both of the emulated signals of the other two phase legs, and upper active switch is actively switched into off-state when the related emulated signal of its bridge leg becomes higher than one of the two emulated signals of the other two phase legs.

7. The multi-pulse line-interphase transformer converter according to claim 6, wherein the controller or the signal processing unit is/are configured to calculate an additional angle and to add the additional angle to one of the pre-calculated phase angles of the emulated signals.

8. The multi-pulse line-interphase transformer converter according to claim 7, wherein the controller and/or the signal processing unit is/are configured to calculate an angle contributing to the additional angle based on measuring input currents on AC grid-side and using their low order harmonic amplitudes.

9. The multi-pulse line-interphase transformer converter according to claim 7, wherein the controller and/or the signal processing unit is/are configured to calculate an angle contributing to the additional angle that compensates for stray inductances and/or other parasitics and/or to control reactive power.

10. The multi-pulse line-interphase transformer converter according to claim 7, wherein the additional angle is a common angle calculated for and added to all emulated signals.

11. The multi-pulse line-interphase transformer converter according to claim 7, wherein the additional angle is calculated for and added to each of the emulated signals individually.

12. The multi-pulse line-interphase transformer converter according to claim 1, wherein the line-interphase transformer comprises thyristors or controllable switches connected anti-parallel to the switches.

13. The multi-pulse line-interphase transformer converter according to claim 12, wherein the electric part is configured such that:
   during an inverter operation mode, each upper antiparallel thyristor $A_H$ is triggered when the related emulated signal of its bridge leg crosses −0.5−D with rising slope, and when it crosses −x+D at falling slope, with x defined as $x=\text{abs}(\sin(\pi/6-2*\pi/pn))$ where pn is the pulse number of the converter, and where D is a positive value in the range of a few percent of a normalized signal providing freewheeling during commutation; and in rectifier operation, each upper anti-parallel thyristor $A_H$ is triggered at zero-crossing at rising slope of the related emulated signal of its bridge leg, and each lower thyristor $A_L$ is triggered at zero-crossing at falling slope of the related emulated signal of its bridge leg.

14. The multi-pulse line-interphase transformer converter according to claim 1, wherein the line-interphase transformer is a 6-, 12-, 18-, 24 or 48-pulse line-interphase transformer.

15. The multi-pulse line-interphase transformer converter according to claim 1, wherein the controller or the signal processing unit is/are configured to calculate an additional angle derived from measured low-frequency harmonics of grid currents of the AC grid and to add the additional angle to one of the pre-calculated phase angles of the emulated signals to improve synchronization of the emulated signals with grid voltages and/or to compensate for stray inductances and/or other parasitics and/or to control reactive power.

* * * * *